United States Patent
Nakajima et al.

(10) Patent No.: US 7,125,591 B2
(45) Date of Patent: Oct. 24, 2006

(54) HARD COAT FILM, PRODUCTION METHOD OF THE SAME, POLARIZING PLATE AND DISPLAY

(75) Inventors: Koji Nakajima, Hino (JP); Takashi Murakami, Hachioji (JP); Ryohei Enomoto, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 347 days.

(21) Appl. No.: 10/856,553

(22) Filed: May 28, 2004

(65) Prior Publication Data

US 2004/0247889 A1  Dec. 9, 2004

(30) Foreign Application Priority Data

Jun. 6, 2003  (JP)  ............................. 2003-162004
Jun. 30, 2003  (JP)  ............................. 2003-186977

(51) Int. Cl.
  B32B 7/02  (2006.01)
  B32B 7/04  (2006.01)
(52) U.S. Cl. ................. 428/1.33; 428/1.5; 106/168.01; 106/170.35; 106/184.3; 536/58; 349/122; 264/1.34; 427/162; 427/362
(58) Field of Classification Search ............. 428/1.33, 428/1.5; 106/168.01, 170.35, 184.3; 536/58, 536/63, 88, 115; 349/122; 264/1.31, 1.34; 427/162, 362
See application file for complete search history.

(56) References Cited

U.S. PATENT DOCUMENTS

| | | | | |
|---|---|---|---|---|
| 2,319,052 A | * | 5/1943 | Fordyce et al. | ............. 264/217 |
| 4,333,998 A | * | 6/1982 | Leszyk | ................. 430/12 |
| 5,631,078 A | * | 5/1997 | Ellery et al. | ............ 428/311.71 |
| 6,778,242 B1 | * | 8/2004 | Murayama et al. | ......... 349/117 |
| 6,958,394 B1 | * | 10/2005 | Saito | ........................... 536/58 |
| 6,984,730 B1 | * | 1/2006 | Yamada et al. | ............... 536/56 |

OTHER PUBLICATIONS

Abstract, JP 2001-183528, Murukami Takashi, Jul. 2001.*
Abstract, JP-A 2003-57402, Hayashi Hiroyuki, Sep. 2004.*
Abstract, JP 2001-91705, Takiyama Nobuyuki, Apr. 2001.*
Abstract, JP 10-450804, Kiyose Atsunobu, Feb. 1998.*
Abstract, JP 08-231761, Shimoda Kazuhiro, Sep. 1996.*
Abstract, JP 2001-235621, August Marien, Aug. 2001.*
Abstract, JP 6-148430, Shibue, Toshiaki, May 1994.*
Abstract, JP 2002-154017, Ueda Hiroko, Jun. 2001.*
Abstract, JP 59-151112, Matsui Takao, Aug. 1984.*
Abstract, JP 1-105738, Kugutsu Yutaka, Apr. 1989.*
Abstract, JP 11-181573, Yara Takuya, Jul. 1999.*
Abstract, JP 2000-26632, Yara Takuya, Jan. 2000.*

(Continued)

*Primary Examiner*—Harold Pyon
*Assistant Examiner*—Sow-Fun Hon
(74) *Attorney, Agent, or Firm*—Lucas & Mercanti, LLP

(57) ABSTRACT

To provide hard coat films having high hardness, and uniform durability against scratching and high flatness even with a small thickness and a large width, and to provide a method producing the same. The hard coat films are provided with an actinic ray curable resin on a cellulose ester film thereof, the cellulose ester film containing a UV absorber and 2 or more plasticizers. One of the plasticizers is a polyalcohol ester type and the other one is a non-phosphate ester type. The cellulose ester film is produced by biaxially stretching of a cellulose ester film with a total acyl substitution degree ranging from 2.6 to 2.9, a number average molecular weight ranging from 80,000 to 200,000, and a ratio of a weight-average molecular weight to a number average molecular weight ranging from 1.4 to 3.0.

13 Claims, 1 Drawing Sheet

OTHER PUBLICATIONS

Abstract, JP 2002-110397, Yara Takuya, Apr. 2002.*
Abstract, JP 2001-337201, Takiyama Nobuyuki, Dec. 2001.*
Abstract, JP 2002-228803, Murakami Takashi, Aug. 2002.*
Abstract, JP 2002-369679, Ikeda Toshiyuki, Jul. 2004.*
Abstract, JP 2002-317883, Murukami Takashi, May 2004.*
Abstract, JP 2003-05823, Ikeda Toshiyuki, Sep. 2004.*
Abstract, JP 2002-049724, Murukami Takashi, Sep. 2003.*
Abstract, JP 10-025388, Nishikawa Akira, Jan. 1998.*
Abstract, JP 10-147739, Sato Hozumi, Jun. 1998.*
Abstract, JP 2002-071957, Murukami Takashi, Mar. 2002.*
Abstract, JP 2002-155395, Tasaka Masayuki, Jun. 2003.*
Abstract, JP 2003-098348, Murukami Takashi, Apr. 2003.*

* cited by examiner

HARD COAT FILM, PRODUCTION METHOD OF THE SAME, POLARIZING PLATE AND DISPLAY

TECHNICAL FIELD

The present invention relates to a hard coat film comprising a specified cellulose ester film on which an actinic ray-cured resin layer is formed, a manufacturing method of the hard coat film, an antireflective film using the hard coat film, and further to a polarizing plate and a display devise using the hard coat film or the antireflective film.

BACK GROUND

In recent years, high quality displays, for example, a full color display for a note book computer or for a mobile telephone, and a high resolution display, have been developed. These high quality displays are required to have a highly functional optical film exhibiting antireflective or antistatic properties. The surface of such a display is often touched so that the display is required to be resistant to scratching. Accordingly, a hard coat film is usually provided on the surface of a display. Recently, in order to improve visibility, displays are required to have antireflective and antistain properties. For these purposes, an optical film of a cellulose ester having a functional film (such as a metal oxide film) has been developed. The functional film may be provided directly or after forming an interlayer on the cellulose ester film. Also, a thinner hard coat film for a thinner display, or a wider hard coat film for a larger display is demanded. Specifically, for a large area display, a sufficiently flat hard coat film is desired. However, so far, a wide and thin hard coat film with superior flatness has been difficult to obtain. Also, a wide film with sufficient scratch resistance has yet to be obtained.

For example, a cellulose ester film provided with a UV-cured resin layer is disclosed in Patent Document 1, however, the pencil hardness grade of the film is around 2 H, which is not fully sufficient.

In order to improve the durability of a cellulose ester film, a UV absorbing agent is usually included in the film.

Generally, a hard coat film is prepared by directly applying a hard coating layer of a thickness from 0.1 to 1 μm on a plastic substrate, or by applying a layer at a thickness from 3 to 10 μm after forming an under coat layer. However, hard coat films produced so far have not been satisfactory hard, because the hard coat layer itself has not been hard enough, or because the hardness of the entire film has not been satisfactory due to waving of the hard coat layer caused by waving of the plastic substrate. The pencil hardness grade of a hard coat film constituted of a cellulose ester film coated with a UV-cured resin layer at the thickness described above has been usually around 2 H, and the desired hardness grade of 4 H or higher has not yet been attained.

In Patent Document 2, a method to increase the hardness of a hard coat film by increasing the thickness of the hard coat layer is disclosed. Increasing the thickness of the hard coat layer is, of course, one of the effective methods to increase the pencil hardness grade of a layer, however, this method may cause a loss in flatness of the layer, and, also, it may be counter to the preferable way to obtain a thinner optical film for use in a thin film display device. Specifically, a thick hard coat layer of the thickness from 20 to 200 μm may cause problems.

In Patent Document 3, a cellulose triacetate film containing a UV absorber, on which a hard coat layer is formed is disclosed. The pencil hardness grade of this film is also around 2 H, which is not fully sufficient.

One of the problems in the process of providing a UV-curable resin layer on a cellulose ester film containing a UV absorbing agent has been that the cellulose ester film itself becomes heated when irradiated by UV rays resulting in a deformation of the cellulose ester substrate. Specifically, for a thinner film, an increasing amount of UV absorber is necessary to retain the required UV absorption, whereby the heating effect becomes more apparent. When the width of a film becomes larger, the film often becomes wavy since it is more difficult to evenly irradiate the UV rays. There also have been problems that, when the UV amount is reduced to avoid the waviness of the substrate, the UV irradiation at the edge of the film become insufficient, resulting in a lack of hardness of the film, and that, when the UV intensity is reduced to avoid the problem, the productivity tends to be markedly lowered.

(Patent Document 1)
Japanese Patent Publication Open to Public Inspection (hereinafter referred to as JP-A) No. 2001-183528.
(Patent Document 2)
JP-A 2003-57402.
(Patent Document 3)
JP-A 2001-91705.

SUMMARY

An embodiment of the present invention is a hard coat film exhibiting uniform scratch resistance and superior flatness while showing prominent hardness even when the film is wide or thin, and a manufacturing process with noticeably high productivity of the hard coat film. Another embodiment is an antireflective film with excellent flatness using the above mentioned hard coat film, of which color shading is extremely reduced and a liquid crystal display with a superior flatness employing the above mentioned hard coat film or the polarizing plate.

DESCRIPTION OF THE PREFERRED EMBODIMENTS

Figure 1:
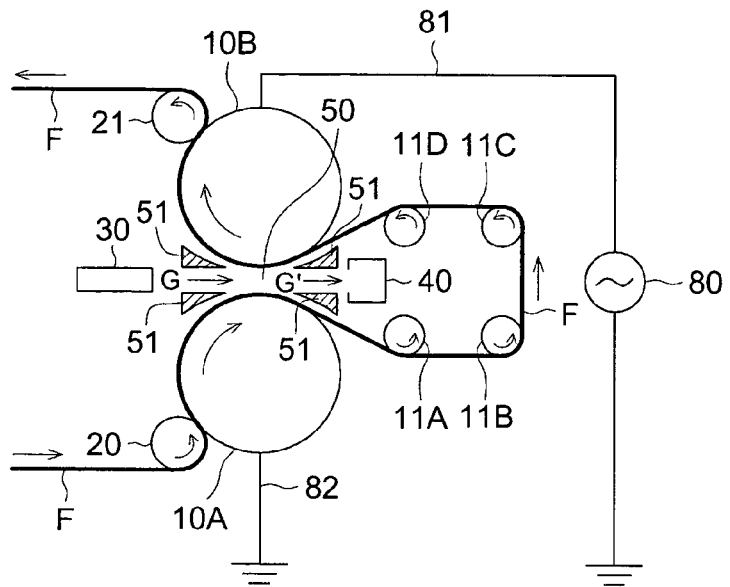
FIG. 1 is a diagram showing an example of a plasma discharger to form a thin metal oxide layer of the present invention.

The object of the present invention will be achieved by the following structures:

1. A hard coat film comprising a cellulose ester film containing a UV absorbing agent and two plasticizers, the cellulose ester film having thereon a layer of an actinic ray-cured resin,
   wherein:
   (i) one of the plasticizers is a polyalcohol ester and the other is a non-phosphate ester;
   (ii) the cellulose ester has a total acyl substitution degree from 2.6 to 2.9;
   (iii) the cellulose ester has a number average molecular weight (Mn) from 80,000 to 200,000;
   (iv) the cellulose ester has a Mw/Mn ratio from 1.4 to 3.0, Mw representing a weight average molecular weight;

(v) the cellulose ester film is a biaxially stretched cellulose ester film;

(vi) the actinic ray-cured resin layer is prepared by coating an actinic ray-curable resin on the cellulose ester film followed by hardening the actinic ray-curable resin via irradiation.

The expression "non-phosphate ester type plasticizer" represents a plasticizer which do not include phosphate ester type plasticizers.

2. The hard coat film of Item 1 wherein an amount of the irradiated actinic ray is from 5 to 100 mJ/cm$^2$.

3. The hard coat film of Item 1 or Item 2 wherein an intensity of the irradiated actinic ray is from 50 to 150 mW/cm$^2$.

4. The hard coat film of any one of Items 1 to 3 wherein the non-phosphate ester plasticizer is selected from the group consisting of: a citrate ester, a glycolate ester, a phthalate ester and a fatty acid ester.

5. The hard coat film of any one of Items 1 to 4 wherein the cellulose ester film has a thickness from 10 to 70 μm, and a d/H value from 4 to 10, d representing the thicknesses of the cellulose ester film and H representing the thickness of the layer of the actinic ray-cured resin.

6. The hard coat film of any one of Items 1 to 5 wherein the cellulose ester film has a width from 1.4 to 4 m.

7. A polarizing plate comprising the hard coat film of any one of Items 1 to 6, wherein an antireflective film is provided on one surface of the hard coat film, said one surface having the actinic ray-cured resin layer, and a phase transforming cellulose ester film is provided on the other surface of the hard coat film.

8. A liquid crystal display provided with the hard coat film of any one of Items 1 to 6 on a surface of the liquid crystal display.

9. A liquid crystal display having the polarizing plate of Item 7 on a surface of the liquid crystal display.

10. A method of producing a hard coat film comprising the steps of:
(i) flow casting a solution containing a cellulose ester, a UV absorbing agent, two plasticizers and a solvent on a support so as to form a cellulose ester film, wherein:
   (a) one of the plasticizers is a polyalcohol ester and the other is a non-phosphate ester;
   (b) the cellulose ester has a total acyl substitution degree from 2.6 to 2.9;
   (c) the cellulose ester has a number average molecular weight (Mn) from 80,000 to 200,000; and
   (d) the cellulose ester has a Mw/Mn ratio from 1.4 to 3.0.
(ii) drying the cellulose ester film to a state in which the cellulose ester film is capable of being peeled from the support;
(iii) peeling of the cellulose ester film from the support;
(iv) biaxially stretching the cellulose ester film while the cellulose ester film still contains the solvent;
(v) drying the cellulose ester film;
(vi) coating an actinic ray-curable resin on the cellulose ester film; and
(vii) hardening the actinic ray-curable resin with irradiating an actinic ray, a quantity of light being from 5 to 100 mJ/cm$^2$.

11. The method of Item 10 wherein the cellulose ester film is stretched in the longitudinal direction, and is then stretched in the lateral direction using a tenter, while the film still contains the solvent.

12. The method of Item 10 or Item 11 wherein the actinic ray-curable resin is hardened while the film is under tension.

Detailed descriptions of the present invention will be presented below.

The present invention is characterized by a hard coat film comprising a cellulose ester film containing a UV ray absorbing agent and two different plasticizers, the cellulose ester film having thereon a layer of an actinic ray-cured resin, wherein:
(i) the total acyl substitution degree of the cellulose ester is from 2.6 to 2.9;
(ii) the number average molecular weight (Mn) of the cellulose ester is from 80,000 to 200,000; and
(iii) the ratio of molecular weight distribution (Mw/Mn) of the cellulose ester is from 1.4 to 3.0, where Mw represents the weight average molecular weight.

In the present invention, the Mw/Mn value of the cellulose ester is preferably from 1.4 to 3.0, which means that it is acceptable when the Mw/Mn value of the cellulose ester itself is from 1.4 to 3.0, however it is more preferable that the Mw/Mn value of entire cellulose ester film including those used as the protective film of the polarizing plate (preferably cellulose triacetate or cellulose acetate propionate) is from 1.4 to 3.0. It is difficult to obtain a cellulose ester having a Mw/Mn value lower than 1.4 in the preparation process. It is possible to obtain a cellulose ester having monodistributed molecular weight by fractionating through gel filtration, however, this method is undesirable since it is expensive. The cellulose ester having Mw/Mn values higher than 3.0 is also undesirable because these materials may cause a loss in flatness of the film. The Mw/Mn value is more preferably from 1.7 to 2.2.

The number average molecular weight (Mn) of the cellulose ester is required to be from 80,000 to 200,000.

For a cellulose ester having a large Mn value with a small molecular weight distribution, the amount of the plasticizers and the UV absorbing agent solving out of the cellulose ester film in the casting process of the hard coat layer are assumed to be small. It is also assumed that this effect becomes more noticeable for a cellulose ester in which cellulose ester molecules are oriented in the lateral direction as a result of a biaxial stretching. The total acyl substitution degree of the cellulose ester is required to be from 2.6 to 2.9 because the appropriately remaining unsubstituted hydroxyl groups in the cellulose ester chains may form hydrogen bonds with the plasticizers and the UV absorbing agent resulting in lowering the amount of those compounds solving out of the cellulose ester film. When a polyalcohol ester plasticizer is used together with other plasticizers, it may prevent other plasticizers solving out of the cellulose ester, and the use of a polyalcohol ester plasticizer together with other plasticizers is more advantageous than to use only one type of plasticizer alone. If a phosphate ester plasticizer is used, not only itself is easy to solve out, but also it may help other plasticizers solving out of the cellulose ester, and the cellulose ester film loses the flatness of the film due to a lack of plasticizers in the film. Plasticizers used in the present invention are not specifically limited, however, two or more types of plasticizers are necessary. It is also necessary that the plasticizers do not include a substantial amount of commonly used phosphate type plasticizers. The expression "not include a substantial amount" means that the amount of included phosphate ester is less than 1 percent by weight, more preferably less than 0.1 percent by weight, and most preferably, no phosphate ester exists.

The hard coat film of the present invention is characterized by exhibiting a pencil hardness grade of 4 H or higher, also by being superior in flatness. What is surprising is that the hard coat film of the present invention is harder compared to those so far produced while the amount of irradiated UV rays is smaller. As a result, the waving of the hard coat film decreases because the heat generated by the UV irradiation also decreases due to the smaller amount of UV rays. In addition, the productivity of the film increases due to the decrease in the amount of UV irradiation. A cellulose ester film with a pencil hardness grade of 4 H or higher is obtained by irradiating UV rays of less than 100 mJ/cm² in the present invention.

Further details of the present invention will be given below.

<Cellulose Ester>

The number average molecular weight (Mn) of the cellulose ester used in the present invention is preferably from 80,000 to 200,000, more preferably from 100,000 to 200,000 and still more preferably from 150,000 to 200,000.

The ratio of molecular weight distribution Mw/Mn of the cellulose ester used in the present invention is preferably from 1.4 to 3.0 and more preferably from 1.7 to 2.2.

The average molecular weight and the molecular weight distribution can be determined by any well known method in the art using high-speed liquid chromatography, a number average molecular weight and a weight average molecular weight are calculated utilizing the same and the ratio (Mw/Mn) thereof can be determined.

The measurement conditions are as follows:

Solvent: methylene chloride
Column: Shodex K806, K805, K803G (three columns of products by Showa Denko K. K. were utilized in a junction)
Column temperature: 25° C.
Sample concentration: 0.1 percent by weight
Detector: RI Model 504 (produced by GL Science Co.)
Pump: L6000 (produced by Hitachi, Ltd.)
Flow rate: 1.0 ml/min
Calibration curve: calibration curves based on 13 samples of standard polystyrene STK, standard polystyrene (manufactured by Tosoh Corp.) Mw=500 to 1,000,000, were utilized. The intervals among the 13 samples should be almost equal.

The cellulose ester used in the present invention is a carboxylate ester having from 2 to 22 carbon atoms, and specifically, a lower fatty acid ester of a cellulose is preferably used. The lower fatty acid represents one having carbon atoms of 6 or fewer, including, for example: cellulose acetate, cellulose propionate, cellulose butyrate, cellulose acetate phthalate and mixed fatty acid esters disclosed in JP-A 10-45804, JP-A 8-231761, and U.S. Pat. No. 2,319,052 (for example: cellulose acetatepropionate and cellulose acetatebutyrate). Among these, cellulose triacetate, and cellulose acetatepropionate are specifically preferable. These cellulose esters are preferably also used in combination.

For cellulose triacetate, one with a total acyl substitution degree from 2.6 to 2.9 is preferably used.

Another preferable cellulose ester besides cellulose triacetate, is one having an acyl group with from 2 to 4 carbon atoms as a substituent, and simultaneously satisfying the following formulae (I) and (II):

$2.6 \leq X+Y \leq 2.9$      Formula (I)

$0 \leq X \leq 2.5$      Formula (II)

wherein X represents an acetyl substitution degree, while Y represents a propionyl substitution degree. Especially, one with $1.9 \leq X \leq 2.5$ and $0.1 \leq Y \leq 0.9$ (while X+Y corresponds to the total acyl substitution degree) is preferable. A hydroxyl group remains in the part where acyl substitution is not carried out. These esters may be prepared through any well known method in the art.

An acyl substitution degree can be determined through a method prescribed in ASTM-D817-96.

Cellulose ester can be prepared using cotton linter, wood pulp or kenaf as starting materials which may be used alone or in combination. It is particularly preferable to use a cellulose ester prepared from cotton linter (hereafter described merely as linter) or from wood pulp.

These cellulose esters may also be used by mixing with each other in any ratio. In case, an acid anhydride (acetic anhydride, propionic anhydride, and butyric anhydride) is used as an acylation agent, cellulose ester can be prepared through a common reaction using an organic acid such as acetic acid and an organic solvent such as methylene chloride, in the presence of a protic catalyst such as sulfuric acid.

In the case of an acetyl cellulose, it is necessary to prolong the acetylation duration in order to obtain a higher degree of acetylation, however, a too long acetylation duration may result in a undesirable reaction such as cutting off of a polymer chain or a decomposition of an acyl group. Accordingly, the acetylation duration should be limited within an appropriate range, however, specifying a degree of acetylation with an acetylation duration is not fully recommended because the acetylation conditions differ when a different reactor or different equipment is utilized. In general, during decomposition of a polymer, the distribution of the molecular weight increases, so that, also in the case of a cellulose ester, the degree of decomposition can be specified by the commonly used Mw/Mn value, where Mw represents a weight average molecular weight and Mn denotes a number average molecular weight. Namely, the Mw/Mn value can be used as one of the parameters representing the degree of acetylation reaction at which the decomposition of the polymer has not been excessive and, at the same time, sufficient acetylation has already been achieved.

An example of a preparation method of cellulose ester is described below. Cotton linter of 100 weight parts as a starting material of cellulose was crushed, and after adding 40 weight parts of acetic acid, the system was pretreated for activation at 36° C. for 20 minutes. Thereafter, 8 weight parts of sulfuric acid, 260 weight parts of acetic anhydride and 350 weight parts of acetic acid were added, after which esterification was performed at 36° C. for 120 minutes. The system was saponification ripened at 63° C. for 35 minutes after being neutralized with 11 weight parts of 24% magnesium acetate aqueous solution to obtain acetyl cellulose. After the system was stirred with adding ten times of an acetic acid solution (acetic acid/water=1/1, based on weight ratio) at ambient temperature for 160 minutes, the resulting solution was filtered and dried to obtain a purified acetyl cellulose having an acetyl substitution degree of 2.75. The obtained acetyl cellulose exhibited Mn of 92,000, Mw of 156,400, and Mw/Mn of 1.7. In a similar manner, cellulose esters having different substitution degrees and different Mw/Mn ratios can be synthesized by controlling the esterification conditions of cellulose ester (temperature, duration and stirring rate) as well as hydrolysis conditions. Removal of low molecular weight component by refining and removal of non-acetized component by filtering from the prepared cellulose ester are also preferably carried out.

Further, a cellulose ester of mixed acids can be prepared by a reaction employing the method described in JP-A 10-45804. The acyl substitution degree can be measured according to the definition of ASTM-D817-96.

The properties of a cellulose ester are influenced by residual amounts of metal components which may be originated from the water used in the manufacturing process. Metal components which may cause insoluble cores should preferably be minimal. Metal ions of iron(Fe), calcium(Ca), magnesium(Mg) and other metals may form insoluble cores by forming salts in combination with decomposition products of polymers which may possibly contain organic acid groups. Accordingly these metal ions should be minimal. The amount of iron is preferably less than 1 ppm. Calcium is contained in a considerable quantity in groundwater or in river water, and an appreciable quantity of which forms hard water. Calcium easily forms a coordinated compound, namely a complex, with acid components such as carbonic acid, sulfuric acid, or with various ligands, and causes much insoluble scum (insoluble residue and turbidity).

The preferable amount of calcium is commonly less than 60 ppm, and is more preferably from 0 to 30 ppm. Too much magnesium may also cause insoluble residue, and the preferable amount is from 0 to 70 ppm, more preferably from 0 to 20 ppm. After an absolutely dry cellulose ester film is treated with a microdigest wet-decomposer (sulfuric acid-nitric acid decomposing) followed by being subjected to alkali fusion, the amounts of iron, calcium, magnesium are determined by means of IPC-AES (Inductively Coupled Plasma-Atomic Emission Spectroscopy).

<Plasticizers>

The cellulose ester film used in the present invention includes at least two plasticizers. The cellulose ester film should not include a substantial amount of a phosphate ester type plasticizer such as triphenyl phosphate ester. The expression "not include a substantial amount" means that the amount of an included phosphate ester is less than 1 percent by weight, more preferably less than 0.1 percent by weight, and most preferably, no phosphate ester exists.

The use of two or more plasticizers may reduce an amount of plasticizers solving out of the cellulose ester film. The reason is not fully clear, however, the following reasons may be pointed out: (i) an amount of each plasticizer can be reduced and (ii) interactions between two types of plasticizers and/or between a plasticizer and the cellulose ester may prevent the plasticizers solving out.

The two or more plasticizers are not specifically limited, however, they may be selected from, for example: aforementioned polyalcohol ester, phthalate ester, citrate ester, fatty acid ester and glycolate ester. At least one of the plasticizers is preferably a polyalcohol ester type plasticizer.

A polyalcohol ester used as a plasticizer in the present invention is an ester prepared from a monocarboxylic acid and an aliphatic polyalcohol having a valence of 2 or more. It preferably contains an aromatic ring or a cycloalkyl ring in the molecule. An aliphatic polyalcohol ester having the valence of from 2 to 20 is preferably used.

A polyalcohol used in the present invention is represented by formula (1)

   Formula (1)

Wherein: $R_1$ represents an organic acid having a valence of n, n represents a positive integer of 2 or more and OH represents an alcoholic and/or a phenolic hydroxyl group.

Examples of a preferable polyalcohol are listed below, however, the present invention is not limited thereto: adonitol, arabitol, ethylene glycol, diethylene glycol, triethylene glycol, tetraethylene glycol, 1,2-propanediol, 1,3-propanediol, dipropylene glycol, tripropylene glycol, 1,2-butanediol, 1,3-butanediol, 1,4-butanediol, dibutylene glycol, 1,2,4-butanetriol, 1,5-pentanediol, 1,6-hexanediol, hexanetriol, galactitol, mannitol, 3-methylpentane-1,3,5-triol, pinacol, sorbitol, trimethylolpropane, trimethylolethane and xylitol.

Specifically, triethylene glycol, tetraethylene glycol, dipropylene glycol, tripropylene glycol, sorbitol, trimethylolpropane and xylitol are preferable.

A mono carboxylic acid to be used for the polyalcohol ester is not specifically limited, and well known compounds such as aliphatic monocarboxylic acid, alicyclic monocarboxylic acid and aromatic monocarboxylic acid may be used. Alicyclic monocarboxylic acid or aromatic monocarboxylic acid is preferably used with respect to improving moisture permeability and retention of additives.

Examples of preferable monocarboxylic acids are listed below, however, the present invention is not limited thereto.

For aliphatic monocarboxylic acids, normal or branched fatty acids having from 1 to 32 carbon atoms are preferably used. The number of carbon atoms is more preferably from 1 to 20 and still more preferably from 1 to 10. The use of an acetic acid will help improve the mutual solubility, so that a mixture of an acetic acid and other monocarboxylic acids is also preferable.

Examples of preferable aliphatic mono carboxylic acids include saturated fatty acids such as: acetic acid, propionic acid, butyric acid, valeric acid, caproic acid, enanthic acid, caprylic acid, pelargonic acid, capric acid, 2-ethyl-hexanoic acid, undecylic acid, lauric acid, tridecylic acid, myristic acid, pentadecylic acid, palmitic acid, heptadecanoic acid, stearic acid, nonadecane acid, arachidic acid, behenic acid, lignoceric acid, cerotinic acid, heptacosanoic acid, montanic acid, melissic acid, lacceric acid, as well as unsaturated fatty acids such as: undecylic acid, oleic acid, sorbic acid, linoleic acid, linolenic acid and arachidonic acid.

Examples of preferable alicyclic monocarboxylic acids include: cyclopentanecarboxylic acid, cyclohexanecarboxylic acid, cyclooctanecarboxylic acid, and derivatives thereof.

Examples of preferable aromatic monocarboxylic acids include: (i) benzoic acid and toluic acid, both of which have benzene ring in which alkyl groups are introduced, (ii) biphenylcarboxylic acid, naphthalenecarboxylic and tetralincarboxylic acid having 2 or more benzene rings, and (iii) derivatives thereof, of these, benzoic acid is specifically preferred.

The molecular weight of the polyalcohol ester is not limited, however, the molecular weight is preferably from 300 to 1,500 and more preferably from 350 to 750. A higher molecular weight is preferable in that the volatility of the polyalcohol is reduced, while a lower molecular weight is preferable with respect to moisture permeability, or to mutual solubility with cellulose ester.

To be used for a polyalcohol ester, carboxylic acid may be used alone or in combination of two or more carboxylic acids. Hydroxyl groups in a polyalcohl may be completely esterified or only partially esterified remaining unsubstituted hydroxyl groups.

Specific examples of polyalcohol esters are shown below:
1
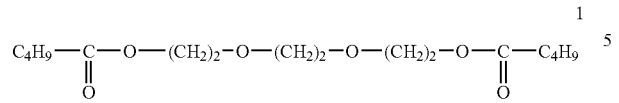
2
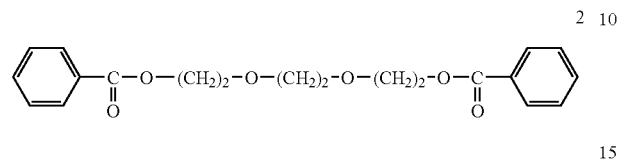
3
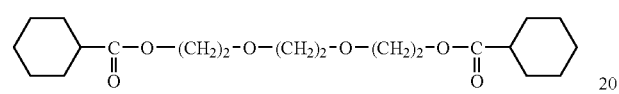
4
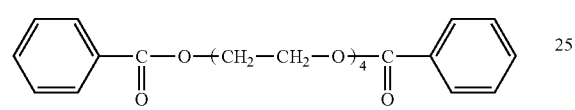
5
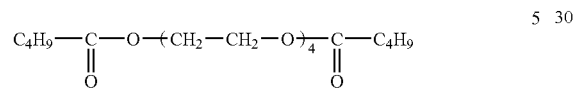
6
7
8
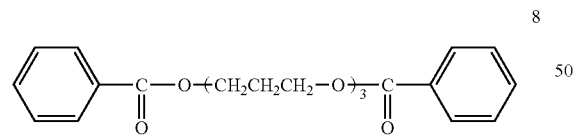
9
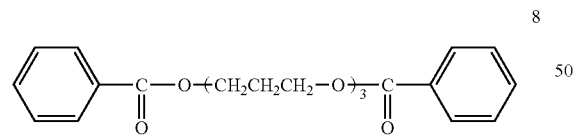
10
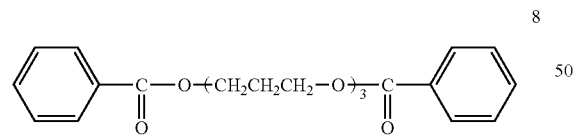
11
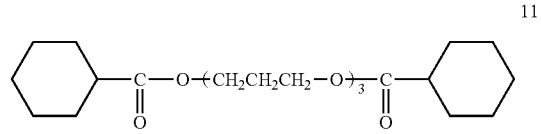
12
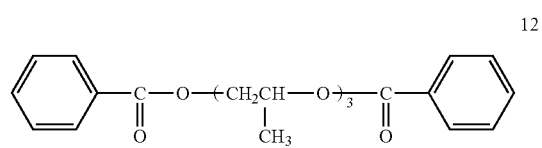
13
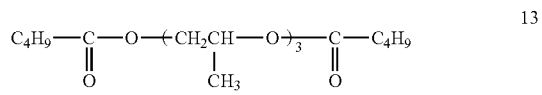
14
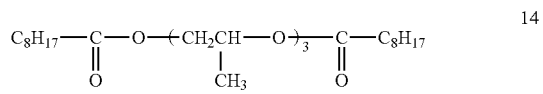
15
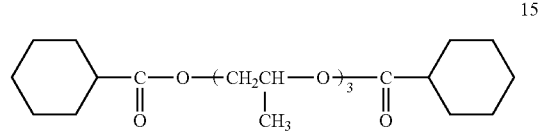
16
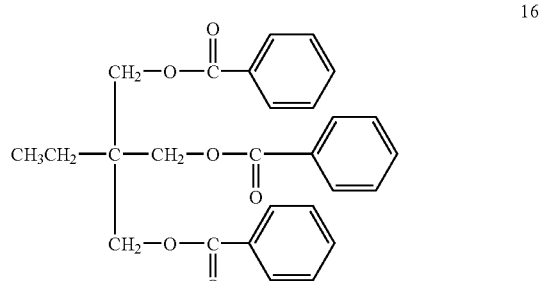
17
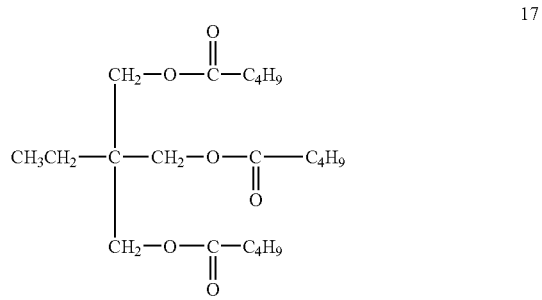

18
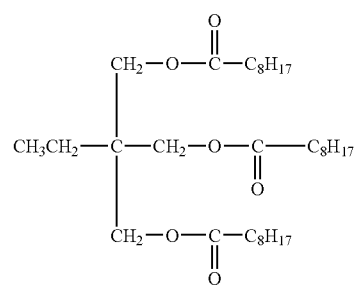
19
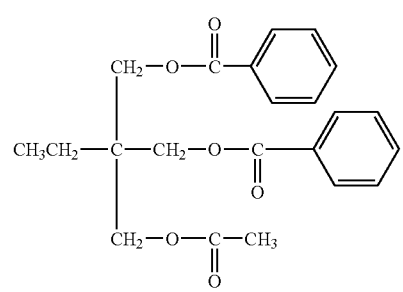
20
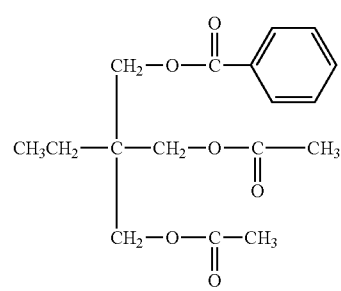
21
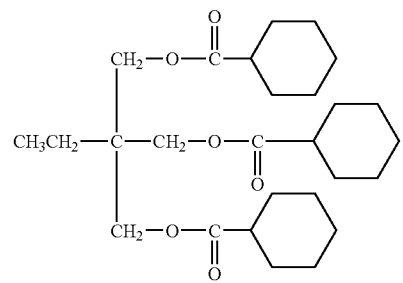
22
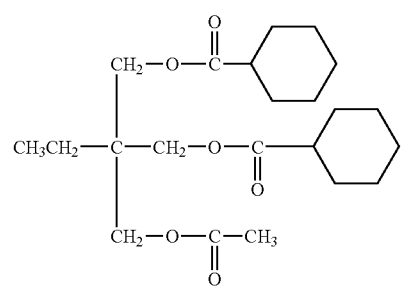
23
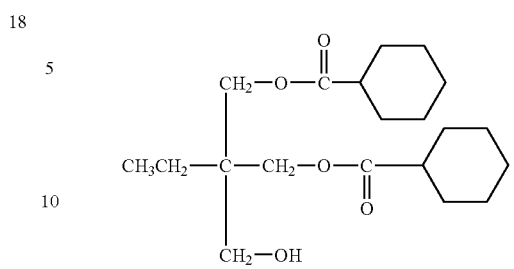
24
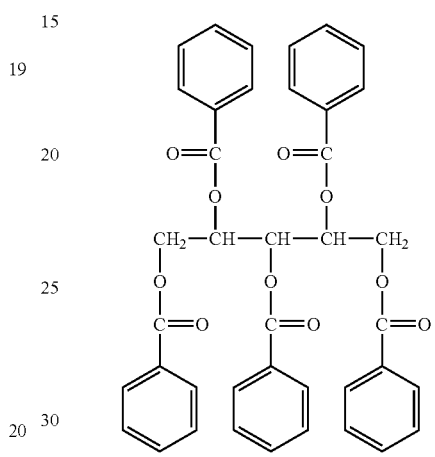
25
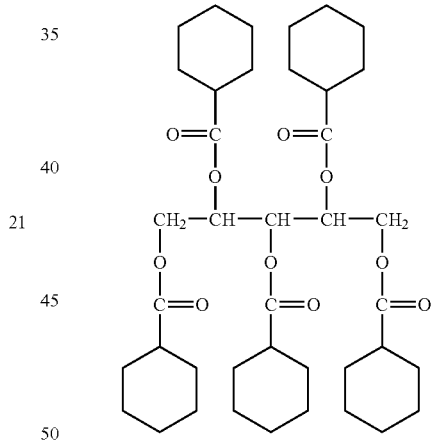
26
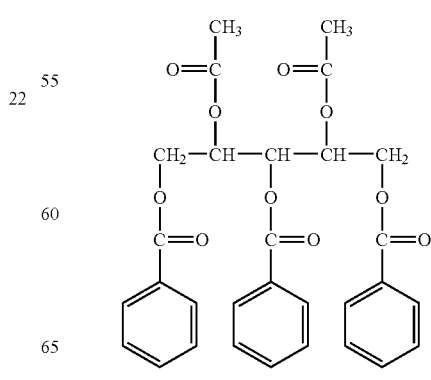

-continued

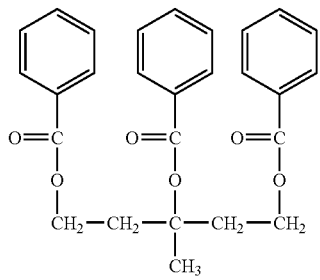 27

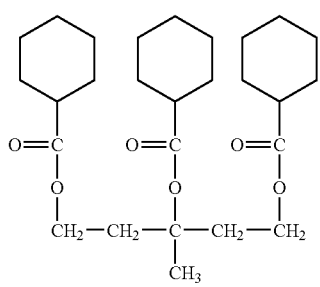 28

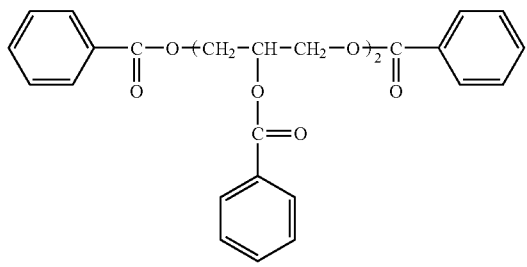 29

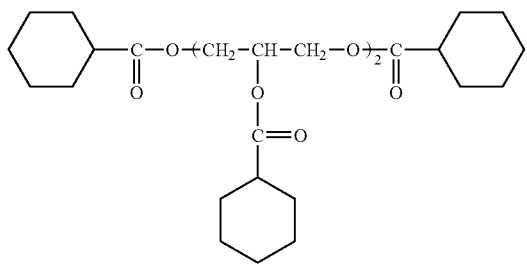 30

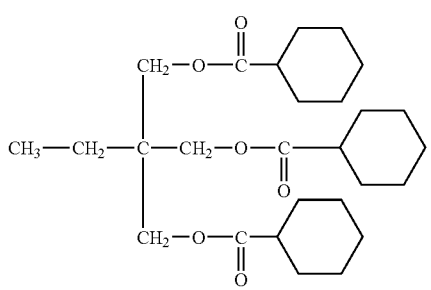 31

-continued

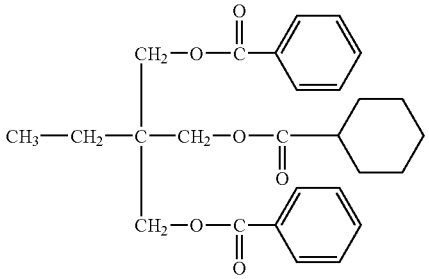 32

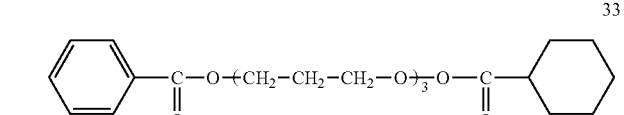 33

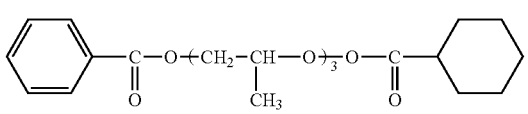 34

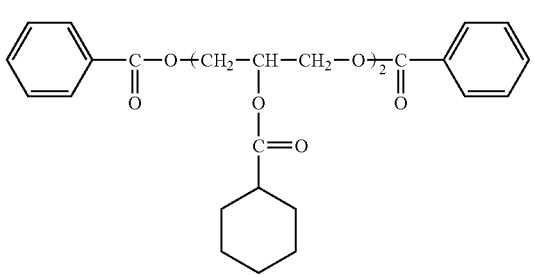 35

A glycolate ester type plasticizer is not specifically limited, however, an alkylphthalyalkyl glycolate type is preferably used, which include, for example: methylphthalylmethyl glycolate, ethylphthalylethyl glycolate, propylphthalyl-propyl glycolate, butylphthalylbutyl glycolate, octylphthalyloctyl glycolate, methylphthalylethyl glycolate, ethylphthalylmethyl glycolate, ethylphthalylpropyl glycolate, methylphthalylbutyl glycolate, ethylphthalylbutyl glycolate, butylphthalylmethyl glycolate, butylphthalylethyl glycolate, propylphthalylbutyl glycolate, butylphthalylpropyl glycolate, methylphthalyloctyl glycolate, ethylphthalyloctyl glycolate, octylphthalylmethyl glycolate and octylphthalylethyl glycolate.

A phthalic ester type plasticizer includes, for example: diethyl phthalate, dimethoxyethyl phthalate, dimethyl phthalate, dioctyl phthalate, dibutyl phthalate, di-2-ethylhexyl phthalate, dioctyl phthalate, dicyclohexyl phthalate and dicyclohexyl terephthalate.

A citrate ester type plasticizer includes, for example: acetyltrimethyl citrate, acetyltriethyl citrate and acetyltributyl citrate.

A fatty acid ester type plasticizer includes, for example: butyl oleate, methylacetyl ricinoleate and dibutyl sebacate.

A phosphoric ester type plasticizer includes, for example: triphenyl phosphate, tricresyl phosphate, cresylphenyl phosphate, octyldiphenyl phosphate, diphenylbiphenyl phosphate, trioctyl phosphate and tributyl phosphate. However, the cellulose ester film used in the present invention does not include a substantial amount of phosphate ester. As described above, the expression "does not include a substantial amount" means that the amount of an included phosphate ester is less than 1 percent by weight, more preferably less than 0.1 percent by weight, and most preferably, contains no phosphate ester.

As mentioned above, the use of a phosphoric ester may result in deformation of the cellulose ester substrate during the step of providing a hard coat layer, and is not preferable in the present invention.

The total content of plasticizers in the cellulose ester film is preferably from 5 to 20 percent by weight based on the total solid portion of the cellulose ester film, more preferably from 6 to 16 percent by weight, and specifically preferably from 8 to 13 percent by weight. The content of each of the two plasticizers is preferably not less than 1 percent by weight and more preferably not less than 2 percent by weight.

The content of the polyalcohol ester type plasticizer is preferably from 1 to 12 percent by weight and specifically preferably from 3 to 11 percent by weight. When an amount of the polyalcohol ester type plasticizer is insufficient, the flatness of the cellulose ester film may be degraded, while, when it is too much, bleeding out may occur. A ratio of a polyalcohol ester type plasticizer to other plasticizers is preferably in the range 1–4 to 4–1, and is more preferably in the range 1–3 to 3–1. Too much plasticizer, as well as too little plasticizer is also unfavorable, since the cellulose ester film becomes easily deformed.

<UV Absorbing Agent>

The cellulose ester film of the present invention includes a UV absorbing agent in order to increase a durability of the film by absorbing UV rays having a wavelength less than 400 nm. The transmittance at a wavelength of 370 nm is preferably not more than 10 percent and is more preferably not more than 5 percent and still more preferably not more than 2 percent.

For example, oxybenzophenone type compounds, benzotriazol type compounds, saricylate ester type compounds, benzophenone type compounds, cyanoacrylate type compounds, triazine type compounds, nickel complex salt type compounds and inorganic particles are included, however, the present invention is not limited thereto.

UV absorbing agents preferably used in the present invention include a benzotriazole type UV absorbing agent and a benzophenone type UV absorbing agent, both of which are extremely transparent and have a superior effect of preventing degradation of the polarizing plate or liquid crystal display. Among these, a benzotriazole type UV absorbing agent having reduced coloring is specifically preferred. Specific examples of a UV absorbing agent include, for example: 5-chloro-2-(3,5-di-sec-butyl-2-hyroxylphenyl)-2H-benzotriazole, (2-2H-benzotriazole-2-ile)-6-(straight chain and side chain dodecyl)-4-methylphenyl, 2-hydroxy-4-benziloxybenzophenone, and 2,4-benziloxybenzophenone; and TINUVIN 109, TINUVIN 171, TINUVIN 234, TINUVIN 326, TINUVIN-327 and TINUVIN 328 which are manufactured by Chiba Speciality Chemicals Co.

Triazine type compounds represented by general formula (I) in JP-A 2001-235621 are also preferably used in the cellulose ester film of the present invention.

A cellulose ester film of the present invention preferably contains 2 or more UV absorbing agents.

A polymer type UV absorbing agent is also preferably used as a UV absorbing agent in the present invention, especially, a polymer type UV absorbing agent described in JP-A 6-148430.

The addition methods of said UV absorbing agents are as follows. They may be dissolved in organic solvents such as alcohol (e.g., methanol, ethanol or butanol), methylene chloride, methyl acetate, acetone and dioxolane, and the resulting solution of which is added to a dope. Alternatively, they may be added directly to a dope. UV absorbing agents such as inorganic powder, which are not soluble in organic solvents, may be dispersed into a mixture of organic solvents and cellulose ester, employing a dissolver or a sand mill, and then added to a dope.

The employed amount of UV absorbing agents may vary depending on the type of UV absorbing agent or on the use condition, however, when the dried layer thickness of the cellulose ester film is from 30 to 200 μm, the content of UV absorbing agents are preferably from 0.5 to 4.0 percent by weight with respect to the cellulose ester film, and more preferably from 0.6 to 2.0 percent by weight.

<Microparticles>

The cellulose ester film of the present invention preferably contains microparticles.

Microparticles may be inorganic, for example: silicon dioxide, titanium dioxide, aluminum oxide, zirconium oxide, calcium carbonate, talk, clay, calcined kaolin, calcined calcium silicate, hydrated calcium silicate, aluminum silicate, magnesium silicate or calcium phosphate. Microparticles containing silicon are preferable in respect to decreasing turbidity, and silicon dioxide is specifically preferable.

The mean diameter of primary particles is preferably from 5 to 50 nm, and more preferably from 7 to 20 nm. The particle should preferably exist as an aggregated secondary particle of a diameter from 0.05 to 0.3 μm. The content of the particle in a cellulose ester film is preferably from 0.05 to 1 percent by weight, and is more preferably from 0.1 to 0.5 percent. In a multi-layered cellulose ester film prepared by a co-casting method, a major part of the particles should preferably exist near the surface.

Microparticle of silicon dioxide available on the market include, for example: AEROSIL R972, R927V, R974, R812, 200, 200V, 300, R202 and OX50 which are manufacture by Nippon Aerosil Co., Ltd.

Microparticles of zirconium oxide available on the market include, for example: AEROSIL R976 and R811 manufacture by Nippon Aerosil Co., Ltd.

Microparticles of polymer available on the market include, for example: silicone resin, fluorine-contained resin and acryl resin. Among these, silicone resin, especially three dimensionally networked silicone resin is preferably used. Examples of silicone resins include: TOSPERL 103, 105, 108, 145, 3120 and 240, which are manufactured by Toshiba Silicone Co., Ltd.

Among the microparticles listed above, AEROSIL 200V and AEROSIL R972V are particularly preferable with respect to exhibiting a lower friction coefficient while the low turbidity is maintained. Kinetic friction coefficient of the rear side of a hard coat layer in the present invention is preferably not more than 1.0.

<Dyes>

In order to optimize color of the cellulose ester film, dyes may preferably be added. For example, a blue dye may be added to reduce a yellow hue of the film. Preferable are anthraquinone type dyes.

The anthraquinone type dye may have any of several kinds of substituents in any of the 8 positions of anthraquinone. Preferable substituents are an aniline group, a hydroxyl group, an amino group, a nitro group and a hydrogen atom. Blue dyes disclosed in JP-A 2001-154017, particularly anthraquinone type dyes, are preferably added to the film.

Additives described above may be added to a dope containing cellulose ester via batch mixing, or, alternatively, they may be added via in-line mixing using a dissolving solvent of the additives. Specifically, microparticles are preferably added, partially or entirely via an in-line mixing, in order to reduce a load to a filter.

In an in-line mixing process of additive solutions, a smaller amount of cellulose ester is preferably dissolved in the dope in order to obtain a sufficiently mixed dope. The amount of cellulose ester is preferably from 1 to 10 weight parts in 100 weight parts of solvent, and more preferably from 3 to 5 weight parts.

As a mixer for in-line addition and mixing, for example, a static mixer manufactured by Toray Engineering Co., Ltd. or a static type in-line mixer High-Mixer SWJ manufactured by Toray Industries, Inc., is preferably used.

<Manufacturing Method of Cellulose Ester>

Next, a manufacturing method of the cellulose ester of the present invention will be explained.

The manufacturing method of the cellulose ester film in the present invention comprises (i) a dope preparing step in which cellulose ester and additives are dissolved in solvents, (ii) a flow-casting step in which a dope is flow-cast on a continuously running endless metal support, (iii) a drying process in which a flow-cast dope is dried to form a web, (iv) a peeling step in which a dried web is peeled from a metal support, (v) a stretching step in both the longitudinal and the lateral directions, (vi) a further drying step and (vii) a winding step of the resulting film.

In the dope preparing step, a higher content of cellulose ester in the dope is preferable since duration of the drying step following the flow-casting step is shortened, however, a too high content may result in loss of filtration accuracy. Preferable content of cellulose ester is from 10 to 35 percent by weight and more preferably from 15 to 25 percent.

A solvent may be used alone, however, two or more solvents may also be used together. A mixture of a good solvent and a poor solvent is more preferably used to increase manufacturing efficiency. A mixed solvent being rich in a good solvent is preferable to increase solubility of the cellulose ester. The preferable mixing ratios are from 70 to 98 percent by weight of a good solvent, and from 2 to 30 percent of a poor solvent. Herein, a good solvent is described as being capable of dissolving cellulose ester with a single use, and a poor solvent as being incapable of dissolving nor swelling cellulose ester even. Sometimes, a solvent works as a good solvent of a cellulose ester, and sometimes as a poor solvent depending on the average acetification degree (degree of acetyl substitution) of the cellulose ester. For example, acetone is a good solvent for an acetic ester of a cellulose ester of which the acetification degree is 2.4, as well as for an acetatepropionate of a cellulose ester, however, it is a poor solvent for an acetic ester of a cellulose of which the acetification degree is 2.8.

Good solvents used in the present invention include, for example: organic halides (such as methylene chloride), dioxolanes, acetone, methyl acetate and methyl acetoacetate, of which methylene chloride and methyl acetate are specifically preferable. However, the present invention is not specifically limited thereto.

Poor solvents used in the present invention include, for example: methanol, ethanol, n-butanol, cyclohexane and cyclohexanone, however, the present invention is not specifically limited thereto. A dope may preferably contain from 0.01 to 0.2 percent by weight of water.

In the step of preparing a dope, a cellulose ester is dissolved in a mixture of solvents using a common method. Dissolving a cellulose ester at a higher temperature is possible when the heating is carried out under a higher pressure. Formation of a gel or an insoluble agglomerate (known as "Mamako" in Japanese which represents insoluble residue when powder is dissolved in a solvent) may be avoided when the dissolving temperatures is higher than the ambient pressure boiling point of the mixed solvents, and simultaneously the temperature is in the range where the mixed solvents do not boil under the applied higher pressure. The following dissolving method is also preferable, in which a cellulose ester is swollen in a mixture of good and poor solvents followed by adding good solvents to dissolve the swollen cellulose ester.

Pressure may be applied by injecting an inert gas such as nitrogen or by increasing the vapor pressure of the solvents by heating. Heating is preferably carried out from the outside of the container. A jacket type heater is preferable because the temperature is easily controlled.

A higher dissolving temperature is preferable with respect to the solubility of the cellulose ester, however, too high a temperature may lower the productivity because the pressure also becomes too high. The dissolving temperature is preferably from 45 to 120° C., more preferably from 60 to 110° C. and still more preferably from 70 to 105° C. The pressure should be controlled not to allow boiling at the set temperature.

A low temperature dissolution method is also preferably utilized, by which cellulose ester is successfully dissolved in solvents such as methyl acetate.

In the next step, the cellulose ester solution thus prepared is filtered using an appropriate filter material. A filter material with a smaller absolute filtration accuracy is more preferable for removing impurities, however, too small a filtration accuracy easily cause clogging up of the filter. The absolute filtration accuracy of the filter is preferably not larger than 0.008 mm, more preferably from 0.001 to 0.008 mm and still more preferably from 0.003 to 0.006 mm.

The filter material used in the present invention is not specifically limited, and plastic filters (such as polypropylene and Teflon(R)) as well as metal(alloy) filters (such as stainless steel) are preferable, since these materials are free from peeling of a fiber, which may occur when fibrous material is used. Impurities and, particularly, luminescent foreign materials contained in the cellulose ester are preferably diminished or entirely removed by filtering.

"Luminescent foreign materials" denote impurities which are observed as bright spots when a cellulose ester film is placed between two polarizing plates arranged in a crossed Nicol state, illuminated with a light from one side and observed from the other. The number of luminescent foreign materials of larger than 0.01 mm in diameter is preferably less than 200 per $cm^2$, more preferably less than 100 per $cm^2$ and still more preferably from 0 to 10 per $cm^2$. The number of luminescent foreign materials of less than 0.01 mm in diameter is preferably minimal.

The dope may be filtered by any common method. One of these preferable filtering methods is to filter the dope at temperatures which are higher than the ambient pressure boiling point of the mixed solvents, and simultaneously in the range where the mixed solvents do not boil under a higher pressure. This method is preferable because the pressure difference between before and after filtering is reduced. The filtering temperature is preferably from 45 to 120° C., more preferably from 45 to 70° C. and still more preferably from 45 to 55° C.

The pressure applied during filtering is preferably low, being preferably less than 1.6 MPa, more preferably less than 1.2 MPa and still more preferably less than 1.0 MPa.

Flow-casting of a dope will be explained below:

A metal support polished to a mirror finished surface is used in the flow-casting step. A polished stainless steel belt or a plated cast drum is used as a metal support. The width of the support is preferably from 1 to 4 m. The surface temperature of the metal support is preferably from −50° C. to a temperature just below the boiling point of the solvent. A relatively high temperature of the support is more preferable because the web is more quickly dried, however, too high a temperature may cause foaming or loss of flatness of the web. The temperature of the support is preferably from 0 to 40° C. and more preferably from 5 to 30° C. Another preferable method is that a web is gelated by cooling the drum followed by peeling the web from the drum while the web still contains much solvent. The method to control the temperature of the support is not specifically limited and a method of blowing warm or cool air onto the support or to apply warm water on the rear side of the support is acceptable. The warm water method is more preferable because the temperature of the metal support becomes stable in a shorter time due to more efficient thermal conduction. In the case when warm air is used, the air temperature should be higher than the desired temperature of the support.

In order to obtain a cellulose ester film with a sufficient flatness, the content of residual solvent in the web when it is peeled from a metal support is preferably from 10 to 150 percent by weight, more preferably from 20 to 40 or from 60 to 130 percent by weight, and specifically more preferably from 20 to 30 or from 60 to 130 percent by weight.

The residual solvent content of the web is defined by the following formula:

Residual solvent content (% by weight)={(M−N)/N}×100

Where M represents weight of a sample of the web collected in the manufacturing step or after manufacturing, and N represents weight of the same sample after it was dried at 115° C. for 1 hour.

In the drying step of a cellulose ester film, the film is peeled from a support and further dried. The content of residual solvent in the resulting film is preferably less than 1 percent, more preferably less than 0.1 percent and specifically preferably from 0 to 0.01 percent.

In a drying process of a film, two methods may be employed, i.e., (i) a roll drying method in which a cellulose ester film is passed through many rollers placed alternatively up and down in a staggered manner, and (ii) a tenter method in which a cellulose ester film is transported while both sides of the film are clipped to put tension in the lateral direction.

It is specifically preferable that a cellulose ester film is peeled from a metal support and is immediately stretched in the transport (longitudinal) direction while the film still contains much residual solvent. The film is then preferably stretched in the lateral direction using an above described tenter method. The stretching magnifications in both the longitudinal and the lateral directions are preferably in the range from 1.05 to 1.3 and more preferably from 1.05 to 1.15. The area of the film is preferably from 1.12 to 1.44 times larger and more preferably from 1.15 to 1.32 times larger, after the film is stretched in both the longitudinal and the lateral directions. The magnification of the stretched film area is a product of the stretch magnifications in both the longitudinal and the lateral directions. When one of the two stretching magnifications is lower than 1.05, the flatness of the film may be reduced by the irradiation of the UV rays in the hard coat layer forming step. A stretching magnification of higher than 1.3 is also unfavorable because of a greater loss in flatness and an increase in haze of the film.

A film is preferably peeled from the support with a tension of larger than 210 N/m and more preferably with a tension from 220 to 300 N/m in order to stretch the film in the longitudinal direction just after peeling.

The method to dry the web is not specifically limited, however, generally, hot air, IR ray, heated rollers or microwave irradiation is used. Hot air is preferably used with respect to ease of cure and low cost.

The preferable drying temperature of a web to obtain stable film dimensions is from 40 to 150° C. and more preferably from 40 to 140° C. The temperature is preferably increased stepwise.

The thickness of a cellulose ester is not specifically limited, however, a thickness from 10 to 200 μm is preferable. So far, a cellulose ester film of a thickness from 10 to 70 μm having a superior flatness as well as a sufficient hardness have been difficult to obtain, however, in the present invention, such films can be obtained at considerably high productivity. Hence, a preferable film thickness is from 10 to 70 μm, more preferably from 20 to 60 μm and most preferably from 35 to 60 μm.

The width of a hard coat film of the present invention is preferably from 1 to 4 m. So far, there have been problems for wide cellulose ester film in that flatness and hardness uniformity of the film have not been fully sufficient due to an uneven irradiation of UV rays in the UV ray-curing step. Another problem has been that, when an antireflective film is formed on a cellulose ester film having insufficient flatness, reflectivity unevenness also becomes a problem. However, in the present invention, a hard coat film can be formed under a smaller amount of UV ray irradiation, so that, the unevenness in UV ray irradiation in the lateral direction of the film tends not to cause unevenness in hardness or serious loss of flatness. Consequently, in the present invention, prior problems in producing a wide cellulose ester film are avoided. A cellulose ester film with a width of 1.4–4.0 m is preferably used and that of 1.4–2.0 m is specifically preferable. A film with a width of more than 4.0 m cause problems in transportation.

<Properties>

Moisture permeability of a cellulose ester film of the present invention at 40° C., 90% RH is preferably less than 850 g/m$^2$·24 h, more preferably from 20 to 800 g/m$^2$·24 h and specifically preferably from 20 to 750 g/m$^2$ 24 h. Moisture permeability is determined employing the method prescribed in JIS Z 0208.

The breaking elongation of a cellulose ester film of the present invention is preferably from 10 to 80 percent and more preferably from 20 to 50 percent.

The visible-light transmittance of a cellulose ester film of the present invention is preferably not less than 90 percent and more preferably not less than 93 percent.

Haze of the cellulose ester film in the present invention is preferably less than 1 percent and more preferably from 0 to 0.1 percent.

Retardation in plane (Ro) of a cellulose ester film in the present invention is preferably from 0 to 70 nm, more preferably from 0 to 30 nm and still more preferably from 0 to 10 nm. Retardation in the thickness direction (Rt) is preferably not more than 400 nm, more preferably from 10 to 200 nm and still more preferably from 30 to 150 nm.

Retardation values (Ro) and (Rt) are represented by the following formulae.

$$Ro=(nx-ny)\times d$$

$$Rt=((nx+ny)/2-nz)\times d$$

wherein d is thickness (nm) of the film, nx is the maximum refractive index in plane of the film (it is also referred to as refractive index in the delayed phase axis direction), ny is the refractive index in plane of the film in the direction normal to the delayed phase axis direction and nz is the refractive index in the thickness direction of the film.

Retardations Ro and Rt are determined by means of an automatic birefringence meter, for example, KOBRA-21ADH (manufactured by Oji Keisokukiki Co., Ltd.) at 23° C. and under 55% RH employing a 590 nm wavelength light.

The delayed phase axis preferably exists within ±1° of the lateral direction or within ±1° of the longitudinal direction.

The preparation method of an acitinic ray-cured resin layer of a hard coat film of the present invention will be described.

In a hard coat film of the present invention, an actinic ray-curable resin is preferably used.

An actinic ray cured resin layer refers to a layer mainly comprising a resin which can be cured through a cross-linking reaction caused by irradiating with actinic rays such as UV rays or electron beams. A composition containing ethylenically unsaturated monomers is preferably utilized to form a hard coat layer by hardening the composition with irradiating actinic rays such as UV rays or electron beams. Typical examples of actinic ray curable resins include a UV ray-curable resin and an electron beam curable resin, however, a UV ray-curable resin is more preferably utilized.

The UV curable resin includes, for example: a UV-curable acryl urethane type resin, a UV-curable polyester acrylate type resin, a UV-curable epoxy acrylate type resin, a UV-curable polyol acrylate type resin and a UV-curable epoxy type resin.

The UV-curable urethane acrylate type resin includes compounds which are generally prepared easily by, initially, reacting polyester polyol with a monomer or a prepolymer of isocyanate, followed by further reacting the product with an acrylate type monomer having a hydroxy group such as 2-hydroxyethyl acrylate, 2-hydroxyethyl methacrylate (herinafter, only acrylates are described, however methacrylates are also included) and 2-hydroxypropyl acrylate. For example, a compound disclosed in JP-A 59-151110 is preferably used.

For example, a mixture of 100 weight parts of UNIDIC 17-806 (Dainippon Ink and Chemicals, Inc.) and 1 weight part of COLONATE L (Nippon Polyurethane Industry Co., Ltd.) is preferably used.

The UV-curable polyester acrylate type resins include compounds which are generally prepared easily by reacting a polyester polyol with a 2-hydroxyethyl acrylate type or a 2-hydroxy acrylate type monomer. For example, those disclosed in JP-A 59-151112 are preferably used.

The UV-curable epoxy acrylate type resin includes compounds which are prepared by reacting an epoxy acrylate oligomer with a reactive dilutant and a photoreaction initiator. For example, as disclosed in JP-A 1-105738 are preferably used.

The UV-curable polyol acrylate type resin includes, for example: trimethylol propane triacrylate, ditrimethylol propane tetracrylate, pentaerythritol triacrylate, pentaerythritol tetracrylate, dipentaerythritol hexaacrylate and alkyl modified dipentaerythritol pentaacrylate.

The photoreaction initiators include, for example: benzoine including derivatives, acetophenone, benzophenone, hydroxy benzophenone, Michler's ketone, α-amyloxim ester and thioxanthone including derivatives. These compounds may be utilized together with a photo sensitizer. The photoreaction initiator described above can also be utilized as a photo sensitizer. Further, sensitizers such as n-butyl amine, triethyl amine and tri-n-butyl phosphine can be utilized together with an epoxy acrylate type photoreaction agent. The amount of a photoreaction initiator or a photo sensitizer is preferably from 0.1 to 15 weight parts, more preferably from 1 to 10 weight parts in 100 weight parts of the UV-curable resins described above.

Resin monomers include, for example: (i) a monomer having one unsaturated double bond, such as methyl acrylate, ethyl acrylate, butyl acrylate, benzyl acrylate, cyclohexyl acrylate, vinyl acetate and styrene, and (ii) a monomer having two or more unsaturated double bonds, such as ethyleneglycol diacrylate, propyleneglycol diacrylate, divinyl benzene, 1,4-cyclohexyane diacrylate and 1,4-cyclohexyldimethyl diacrylate. Foregoing trimethylolpropane triacrylate and pentaerythritol tetraacrylate ester are also included.

Selected products available on the market as a UV curable resin which can be utilized in the present invention may be: Adekaoptomer KR, BY Series such as KR-400, KR-410, KR-550, KR-566, KR-567 and BY-320B (manufactured by Asahi Denka Co., Ltd.); Koeihard A-101-KK, A-101-WS, C-302, C-401-N, C-501, M-101, M-102, T-102, D-102, NS-101, FT-102Q8, MAG-1-P20, AG-106 and M-101-C (manufactured by Koei Kagaku Co., Ltd.); Seikabeam PHC2210(S), PHC X-9(K-3), PHC2213, DP-10, DP-20, DP=30, P1000, P1100, P1200, P1300, P1400, P1500, P1600, SCR900 (manufactured by Dainichiseika Kogyo Co., Ltd.); KRM7033, KRM7039, KRM7131, UVECRYL29201 and UVECRYL29202 (manufactured by Daicel U. C. B. Co., Ltd.); RC-5015, RC-5016, RC-5020, RC-5031, RC-5100, RC-5102, RC-5120, RC-5122, RC-5152, RC-5171, RC-5180 and RC-5181 (manufactured by Dainippon Ink & Chemicals, Inc.); Olex No. 340 Clear (manufactured by Chyugoku Toryo Co., Ltd.); Sunrad H-601, RC-750, RC-700, RC-600, RC-500, RC-611 and RC-612 (manufactured by Sanyo Kaseikogyo Co., Ltd.); SP-1509 and SP-1507 (manufactured by Syowa Kobunshi Co., Ltd.); RCC-15C (manufactured by Grace Japan Co., Ltd.) and Aronix M-6100, M-8030 and M-8060 (manufactured by Toagosei Co., Ltd.).

Concrete examples include, for example: trimethylol propane triacrylate, ditrimethylol propane tetracrylate, pentaerythritol triacrylate, pentaerythritol tetracrylate, dipentaerythritol hexaacrylate and alkyl modified dipentaerythritol pentaacrylate.

These actinic ray curable resin layers can be applied by any method well known in the art, for example: a gravure coater, a dip coater, a reverse coater, a die coater and ink jet printing.

Light sources to cure layers of UV curable-resin by photo-curing reaction are not specifically limited, and any light source may be used as far as UV ray is generated. For example, a low-pressure mercury lamp, a medium-pressure mercury lamp, a high-pressure mercury lamp, an ultrahigh-pressure mercury lamp, a carbon arc lamp, a metal halide lamp and a xenon lamp may be utilized. The preferable irradiation quantity of light may be changed depending on the type of lamp, however, it is generally from 5 to 100 mJ/cm$^2$, and is more preferably from 20 to 80 mJ/cm$^2$.

A hard coat film exhibiting a pencil hardness grade of 4 H or higher as well as showing a fully sufficient flatness has not been obtained in the past under the aforementioned lower amount of UV irradiation. In the present invention, a hard coat film not requiring a maximum hardness can be manufactured with a still lower amount of UV irradiation, so that productivity of the cellulose ester film increases markedly. So far the forming rate of a hard coat film has been kept relatively low due to limitation of UV irradiation, however, in the present invention, a hard coat film is manufactured at a much higher rate.

An irradiation of an actinic ray is preferably carried out under tension in the longitudinal direction of the film and more preferably under tension in both the lateral and the longitudinal directions. The preferable tension is from 30 to 300 N/m. The method to provide tension is not specifically limited and following methods are preferably used: (i) a method of providing tension while the film is being transported over back rolls, and (ii) a method using a tenter to give tension in the lateral direction or in biaxial directions. A cellulose ester film exhibiting a superior flatness can be obtained using these methods.

An organic solvent used for a coating solution of a UV curable-resin can be selected from, for example: the hydrocarbon series, the alcohol series (methanol, ethanol, isopropanol, butanol and cyclohexanol), the ketone series (acetone, methyl ethyl ketone and isobutyl ketone), the ester series (methyl acetate, ethyl acetate and methyl), the glycol ether series and other organic solvents. These organic solvents may be also used in combinations. The above mentioned organic preferably contains propyleneglycol monoalkylether (with an alkyl group having 1 to 4 carbon atoms) or propyleneglycol monoalkylether acetate ester (with an alkyl group having 1 to 4 carbon atoms) with a content of 5 percent by weight or more, and more preferably from 5 to 80 percent by weight.

In a coating solution of a UV ray-curable resin, a silicon compound such as a polyether modified silicone oil, is preferably added. The number average molecular weight of a polyether modified silicone oil is preferably from 1,000 to 100,000 and more preferably from 2,000 to 50,000. Addition of a polyether modified silicone oil with a number average molecular weight of less than 1,000 may lower the drying rate of the coating solution, while on the other hand, that of more than 100,000 may result in a difficulty in bleeding out at the surface of the coated film. Silicon compounds available on the market include, for example: DKQ8-779 (a trade name of Dow Corning Corp.), SF3771, SF8410, SF8411, SF8419, SF8421, SF8428, SH200, SH510, SH1107, SH3771, BX16-034, SH3746, SH3749, SH8400, SH3771M, SH3772M, SH3773M, SH3775M, BY-16-837, BY-16-839, BY-16-869, BY-16-870, BY-16-004, BY-16-891, BY-16-872, BY-16-874, BY22-008M, BY22-012M, FS-1265 (all being trade names of Dow Corning Toray Silicone Co., Ltd.), KF-101, KF-100T, KF351, KF352, KF353, KF354, KF355, KF615, KF618, KF954, KF6004, siliconex-22-945, X22-160AS (all being trade names of Shin-Etsu Chemical Co., Ltd.), XF3940, XF3949 (both being trade names of Toshiba Silicones Co., Ltd.), DISPARLONLS-009 (a trade name of Kusumoto Chemicals Ltd.), GLANOL410 (a trade name of Kyoeisha Chemicals Co., Ltd.), TSF4440, TSF4441, TSF4445, TSF4446, TSF4452, TSF4460 (all being trade names of GE Toshiba Silicones Co., Ltd.), BYK-306, BYK-330, BYK-307, BYK-341, BYK-361 (all being trade names of BYK-Chemie Japan KK), L Series (L-7001, L-7006, L-7604 and L-9000), Y Series and FZ Series (FZ-2203, FZ-2206 and FZ-2207) (all from Nippon Unicar Co., Ltd.).

These compositions may improve the coating ability of the solution onto a substrate or an under coat layer. If these compounds are used as the top layer of stacked film layers, these compounds may contribute to improve not only water-resistance, oil-resistance and antistaining properties, but also improve scratch resistance of the film. The content of the added silicon compound is preferably from 0.01 to 3 percent by weight based on the solid composition in the coating solution.

Aforementioned coating methods are preferably also used to coat a solution of UV ray-curable resin. The thickness of a wet film of coated UV-curable resin is preferably from 0.1 to 30 μm and more preferably from 0.5 to 15 μm. The thickness of the dried film of the same is preferably from 0.1 to 10 μm and more preferably from 1 to 10 μm.

A hard coat film having a thickness of a cellulose ester film from 10 to 70 μm and, also having a (d/H) ratio from 4 to 10 may exhibit a superior flatness as well as a sufficient hardness and scratch resistance, wherein, H represents the thickness of the hard coat layer and d represents the thickness of the cellulose ester film. This is because, a thinner hard coat layer compared to that of a cellulose ester film (giving a larger (d/H) value) may result in giving insufficient hardness and scratch resistance, on the other hand, a thicker hard coat layer compared to the same (giving a smaller (d/H) value) may result in forming a film lacking in flatness.

A UV ray-curable resin layer is preferably irradiated with UV rays while the layer is being dried, or alternatively after it is dried. The duration of UV ray irradiation of the amount from 5 to 100 mJ/cm$^2$ as mentioned above is preferably from 0.1 seconds to 5 minuets. With respect to working efficiency and hardening efficiency of the UV-curable resin, the duration of the same is more preferably from 0.1 to 10 seconds.

The intensity of the actinic ray is preferably from 50 to 150 mW/m$^2$.

The UV-cured resin layer thus obtained may preferably contain inorganic or organic microparticles in order to attain the following characteristics: (i) preventing blocking, (ii) improving scratch resistance, (iii) providing an antiglare property and (iv) optimizing the reflective index.

Inorganic microparticles to be contained in a hard coat layer include, for example: silicon oxide, titanium oxide, aluminum oxide, zirconium oxide, magnesium oxide, calcium carbonate, talc, clay, calcined kaolin, calcined calcium silicate, hydrated calcium silicate, aluminum silicate, magnesium silicate and calcium phosphate. Among these, silicon oxide, titanium oxide, aluminum oxide, zirconium oxide, magnesium oxide are specifically preferable.

Organic microparticles include, for example: microparticles of polymethacrylic acid methyl acrylate resin, acryl styrene based resin, polymethyl methacrylate resin, silicon based resin, polystyrene based resin, polycarbonate resin, benzoguanamine based resin, melamine based resin, polyolefin based resin, polyester based resin, polyamide based resin, polyimide based resin and polyfluorinated ethylene based resin. Specifically preferable organic microparticles include, for example: microparticles of cross-linked polystylene (such as SX-130H, SX-200H and SX-350H manufactured by Soken Chemical & Engineering Co., Ltd.) and polymethyl methacrylate (such as MX150 and MX300 manufactured by Soken Chemical & Engineering Co., Ltd.).

The mean particle diameter of the microparticles is preferably from 0.005 to 5 µm and specifically preferably from 0.01 to 1 µm. The mixing ratio of microparticles and UV-curable resin composition is preferably from 0.1 to 30 weight parts of microparticles per 100 weight parts of resin composition.

A UV curable resin layer is preferably a clear hard coat layer having the mean center-line roughness (Ra: prescribed by JIS B 0601) of 1 to 50 nm. The Ra value of the anti-glare layer is preferably from 0.1 to 1 µm. The mean center line roughness (Ra) is preferably measured by means of a surface roughness meter using interference of light, for example, RST/PLUS manufactured by WYKO Co., Ltd.

The hard coat film of the present invention having a hard coat layer on one surface of the cellulose ester film is preferably provided with a back coat layer on the other surface of the cellulose ester film. A back coat film is provided on a cellulose ester film to prevent curling which may occur when a hard coat layer or other layers are formed on a cellulose ester film by means of a coating method or by CVD. Namely, by adding a counter force to curl toward the back coat side, the force to curl toward the hard coat layer side may be balanced out. Also, a back coat layer preferably has a feature to prevent blocking. For this purpose, microparticles are preferably added to a coating composition of back coat layer.

Microparticles preferably added to the back coat layer include inorganic microparticles, for example, silicon dioxide, titanium dioxide, aluminum oxide, zirconium oxide, calcium carbonate, talc, clay, calcined kaolin, calcined calcium silicate, tin oxide, indium oxide, zinc oxide, ITO, hydrated calcium silicate, aluminum silicate, magnesium silicate and calcium phosphate. Microparticles containing silicon are preferably used to minimize the haze. Of the above, silicon dioxide is specifically preferable.

Inorganic microparticle available on the market include, for example: AEROSIL R972, R927V, R974, R812, 200, 200V, 300, R202 and OX50 which are manufacture by Nippon Aerosil Co. Ltd. Microparticles of zirconium oxide available on the market include, for example: AEROSIL R976 and R811 manufacture by Nippon Aerosil Co. Ltd.

Microparticles of polymer include, for example: silicone resin, fluorine-contained resin and acryl resin. Among these, silicone resin, especially three dimensionally networked silicone resin is preferably used. Examples of silicone resins available on the market include TOSPERL 103, 105, 108, 145, 3120 and 240, which are manufactured by Toshiba Silicone Co., Ltd.

Among the microparticles listed above, AEROSIL 200V and AEROSIL R972V are particularly preferable with respect to effectively preventing blocking while minimizing haze. The kinetic friction coefficient of the rear side of the hard coat layer in the present invention is preferably less than 0.9 and specifically preferably from 0.1 to 0.9.

The content of microparticles contained in the back coat layer is preferably from 0.1 to 50 percent by weight and more preferably from 0.1 to 10 percent by weight. The increase in haze after the hard coat film is provided with a back coat layer is preferably less than 1 percent, more preferably less than 0.5 percent and specifically preferably from 0.0 to 0.1 percent.

The back coat layer is formed by means of a coating method using a coating solution containing a solvent which dissolves and/or swells cellulose ester (hereafter this type of solvent is referred to as "type A solvent"). The solvent may occasionally be comprised of a solvent which does not dissolve nor swell cellulose ester (hereinafter this type of solvent is referred to as "type B solvent"). The mixing ratio of these solvents and the amount of the coating solution to be used for forming a back coat layer is appropriately determined depending on the extent of the curl and the type of the resin used for the hard coat film.

In order to have a larger effect to prevent curl in the film, the mixing ratio of type A solvent is increased while the ratio of type B solvent is decreased. The mixing ratio of type A solvent to type B solvent is preferably 10 to 0 through 1 to 9. Examples of type A solvent include: dioxane, acetone, methyl ethyl ketone, N,N-dimethyl formamide, methyl acetate, ethyl acetate, trichloroethylene, methylene chloride, ethylene chloride, tetrachloroethane, trichloroethane and chloroform. Examples of type B solvent include: methanol, ethanol, n-propyl alcohol, i-propyl alcohl, n-butanol and hydrocarbons (such as toluene, xylene and cyclohexane).

The back coat layer is coated by means of, for example: a gravure coater, a dip coater, a reverse coater, a wire-bar coater and a die coater, in a thickness of preferably from 1 to 100 µm and specifically preferably from 5 to 30 µm.

Resins utilized as a binder in a back coat layer include, for example: (i) vinyl type homopolymers or copolymers such as a vinyl chloride/vinyl acetate copolymer, a vinyl chloride resin, a vinyl acetate resin, a copolymer of vinyl acetate and vinyl alcohol, a partially hydrolyzed vinyl chloride/vinyl acetate copolymer, a vinyl chloride/vinylidene chloride copolymer, a vinyl chloride/acrylonitrile copolymer, an ethylene/vinyl alcohol copolymer, a chlorinated polyvinylchloride, an ethylene/vinyl chloride copolymer and a ethylene/vinyl acetate copolymer; (ii) cellulose ester type resins such as cellulose nitrate, cellulose acetate propionate, cellulose diacetate, cellulose triacetate, cellulose acetate phthalate and cellulose acetate butylate; (iii) rubber type resins such as a copolymer of maleic acid and/or acrylic acid, a copolymer of acrylate ester, an acrylonitrile/stylene copolymer, a chlorinated polyethylene, an acrylonitrile/chlorinated polyethylene/stylene copolymer, a methylmethacrylate/butadiene/stylene copolymer, an acryl resin, a polyvinylacetal resin, a polyvinylbutyral resin, a polyester polyuretane resin, a polyether polyurethane resin, a polycarbonate polyurethane resin, a polyester resin, a polyether resin, a polyamide resin, an amino resin, a stylene/butadiene resin and a butadiene/acrilonitrile resin; (iv) a silicone type resin; and (v) a fluorine-containing type resin, however, the present invention is not limited thereto. Examples of acryl resins available on the market include homopolymers and copolymers produced from acryl or methacryl monomers, such as: Acrypet MD, VH, MF and V (manufactured by Mitsubisi Rayon Co., Ltd.), Hi Pearl M-4003, M-4005, M-4006, M-4202, M-5000, M-5001 and M-4501 (Negami Chemical Industrial Co., Ltd.), Dianal BR-50, BR-52, BR-53, BR-60, BR-64, BR-73, BR-75, BR-77, BR-79, BR-80, BR-82, BR-83, BR-85, BR-87, BR-88, BR-90, BR-93, BR-95, BR-100, BR-101, BR-102, BR-105, BR-106, BR-107, BR-108, BR-112, BR-113, BR-115, BR-116, BR-117 and BR-118

(manufactured by Mitsubisi Rayon Co., Ltd.). A resin used in the present invention may suitably be selected from the above examples.

Cellulose type resin such as diacetyl cellulose and cellulose acetate propionate is specifically preferable.

The coating order of a back coat layer on a cellulose ester film is not specifically limited, namely, a back coat layer may be formed before or after forming the layers on the opposite surface (hard coat layer and other layers such as antistatic layer), however, when a back coat layer also functions as an antiblocking layer, the back coat layer is preferably formed before the opposite side layers. Coating of a back coat layer may preferably be divided in two or more times.

The hard coat film of the present invention is suitable for forming a thin layer of a metal oxide on it, by means of a coating method or plasma CVD, specifically, by means of an ambient pressure plasma treatment. A thin metal oxide layer formed on the hard coat layer of the present invention is effectively used as an antireflective layer.

As ambient pressure plasma treatments, those disclosed in JP-A 11-181573, JP-A 2000-26632 and JP-A 2002-110397 (in which high frequency pulse voltage is used) are suitable. A conductive layer is formed using an ambient pressure plasma treatment disclosed in JP-A 2001-337201. An antireflective layer is formed using methods disclosed in JP-A 2002-228803, Japanese Patent Application No. 2002-369679, No. 2002-317883 and No. 2003-50823. An antistain layer may be formed using methods disclosed in Japanese Patent Application No. 2-3-93963 and No. 2002-49724.

On a hard coat film of the present invention, a thin layer of a metal compound is preferably formed under an atmosphere in which nitrogen is contained as a major component, wherein the metal compound includes: metal oxide ($SiO_x$, $SiO_xN_y$, $TiO_xN_y$, $SiO_xC_z$ (x=1–2, y=0.1–1 and z=0.1–2)), metal nitrides, metal oxide-nitrides and metal carbides. Among these, metal oxide is more preferably used. The content of nitrogen in the atmosphere is preferably from 60 to 99.9 percent by volume, more preferably from 75 to 99.9 percent by volume and still more preferably from 90 to 99.9 percent by volume. Besides nitrogen, argon and helium may be preferably contained. A metal compound gas to form a thin layer and an aiding gas or a booster gas such as oxygen and hydrogen which promotes the deposition, may also be contained. Using these gases, a low refractive index layer, a high refractive index layer, a medium refractive index layer, a transparent conductive layer, an antistatic layer and an antistain layer can be formed.

Next, an antireflective layer to be formed on a hard coat layer will be described.

<Antireflective Layer>

In the present invention, the method to provide an antireflective layer is not specifically limited and the layer can be formed by coating, spattering, evaporation, CVD (Chemical Vapor Deposition) or in combination of these method.

Methods to form an antireflective layer via a coating method includes: (i) a method in which metal oxide powder is dispersed in a binder resin having been dissolved in solvents followed by coating and then drying; (ii) a method in which a polymer having a cross-linked structure is utilized as a binder resin; and (iii) a method in which an ethylenically unsaturated monomer and a photopolymerization initiator are included in a coating solution and formation of a thin layer is carried out by irradiating the same with an actinic ray.

In the present invention, a hard coat film may have an antireflective layer on it. In order to decrease reflectance, a hard coat film preferably has stacking layers on it, for example, a low refractive index metal oxide layer as a top layer and a high refractive index metal oxide layer as a second layer which is in between the above mentioned top layer and the hard coat layer. Further, it may have a medium refractive index metal oxide layer (a metal oxide layer of which the refractive index is controlled by using a different metal or by changing the amount of the metal) as a third layer in between the second layer and the hard coat layer. The refractive index of a high refractive index layer is preferably from 1.55 to 2.30 and more preferably from 1.57 to 2.20. The refractive index of a medium refractive index layer is controlled to be an intermediate value between a refractive index of a cellulose ester substrate (around 1.5) and of a high refractive index layer. The refractive index of a medium refractive index layer is preferably from 1.55 to 1.80. The thickness of a metal oxide layer is preferably from 5 nm to 0.5 μm, more preferably from 10 nm to 0.3 μm and most preferably from 30 nm to 0.2 μm. The haze of a metal oxide layer is preferably not more than 5%, more preferably not more than 3% and most preferably not more than 1%. The pencil hardness grade of a metal oxide layer under a weight of 1 kg is preferably 3 H or higher and most preferably 4 H or higher. In case a metal oxide layer is formed by a coating method, inorganic microparticles and a binder polymer are preferably incorporated therein.

Microparticles utilized in a metal oxide layer such as a medium refractive index layer and a high refractive index layer preferably have a refractive index of from 1.80 to 2.80 and more preferably from 1.90 to 2.80. The weight average diameter of a primary particle of inorganic microparticles is preferably from 1 to 150 nm, more preferably from 1 to 100 nm and most preferably from 1 to 80 nm. The weight average diameter of inorganic microparticles in a layer is preferably from 1 to 200 nm, more preferably from 5 to 150 nm, still more preferably from 10 to 100 nm and most preferably from 10 to 80 nm. The mean particle diameter is measured by a light scattering method when it is larger than 20 or 30 nm, and by electron micrography when it is not larger than 20 or 30 nm. The specific surface area of inorganic microparticles is preferably from 10 to 400 m$^2$/g, more preferably from 20 to 200 m$^2$/g and most preferably from 30 to 150 m$^2$/g, as a value measured by BET method.

Inorganic microparticles are made of a metal oxide. Examples of metal oxides include such as: titanium dioxide (eg. rutile, mixed crystals of rutil/anatase, anatase, an amorphous structure), tin oxide, indium oxide, ITO, zinc oxide and zirconium oxide. Among these, titanium dioxide, tin oxide and indium oxide are specifically preferred. Inorganic microparticles comprise one of above mentioned metal oxides as a main component, and, additionally, other elements may be comprised, wherein, a main component means a component of the largest content (percent by weight). Examples of such "other elements" include: Ti, Zr, Sn, Sb, Cu, Fe, Mn, Pb, Cd, As, Cr, Hg, Zn, Al, Mg, Si, P and S.

Inorganic microparticles may be surface treated. Surface treatment can be performed by use of an inorganic compound or an organic compound. Examples of an inorganic compound utilized for the surface treatment include alumina, silica, zirconium oxide and iron oxide. Among these, alumina and silica are preferable. Examples of an organic compound utilized for the surface treatment include polyol, alkanol amine, stearic acid, a silane coupling agent and a titanate coupling agent. Among them, a silane coupling agent is most preferable. The microparticles may be subjected to in combinations of two or more kinds of surface treatment.

The shape of inorganic microparticles is preferably a rice shape, a spherical shape, a cubic shape, a layered shape, a cone shape or an irregular shape. Two or more kinds of inorganic microparticles may be utilized in combinations in a metal oxide layer.

The content of inorganic microparticles in a metal oxide layer is preferably from 5 to 90 percent by volume, more preferably from 10 to 65 percent by volume and still more preferably from 20 to 55 percent by volume.

Inorganic microparticles may be supplied to a coating solution of a metal oxide layer, as a dispersed solution in a medium (solvent). As a dispersion medium for inorganic microparticles, a liquid having a boiling point of from 60 to 170° C. is preferably utilized. Concrete examples of a dispersion medium include water, alcohols (e.g., methanol, ethanol, isopropanol, butanol and benzyl alcohol), ketones (e.g., acetone, methyl ethyl ketone, methylisobutyl ketone and cyclohexanone), esters (e.g., methyl acetate, ethyl acetate, propyl acetate, butyl acetate, methyl formate, ethyl formate, propyl formate and butyl formate), aliphatic hydrocarbons (e.g., hexane and cyclohexane), aromatic hydrocarbons (e.g., benzene, toluene and xylene), amides (e.g., dimethylformamide, dimethylacetoamide and n-methylpyrrolidone), ethers (e.g., diethyl ether, dioxane and tetrahydrofuran) and etheralcohols (e.g., 1-methoxy-2-propanol). Among them, specifically preferable are toluene, xylene, methylethyl ketone, cyclohexanone and butanol.

Inorganic microparticles may be dispersed in a medium by use of a dispersing device. Examples of a dispersing device include a sand grinder mill (e.g., pin attached beads mill), a high-speed impeller mill, a pebble mill, a roller mill, an atliter and a colloidal mill. Specifically preferable are a sand grinder mill and a high-speed impeller mill. Further a preliminary dispersion treatment may be performed. Examples of a dispersion device for the preliminary dispersion treatment include a ball mill, a three-roll mill, a kneader and an extruder.

The metal oxide layer preferably comprises a polymer having a cross-linked structure (hereinafter, also referred to as "a cross-linked polymer") as a binding polymer. Examples of a cross-linked polymer include cross-linked products of such as, a polymer having a saturated hydrocarbon chain such as polyolefin (hereinafter, generically referred as "polyolefin"), polyether, polyurea, polyurethane, polyester, polyamine, polyamide and melamine resin. Among these, preferable are cross-linked products of polyolefin, polyether and polyurethane, more preferable are cross-linked products of polyolefin and polyether and most preferable is a cross-linked product of polyolefin. Further, a cross-linked polymer provided with an anionic group is more preferable. An anionic group functions to maintain the dispersed state of inorganic microparticles. A cross-linked structure provides a polymer with a film forming ability and functions to strengthen the film. The above mentioned anionic group may be bonded directly or through a connecting group to a polymer chain, however, it is more preferably bonded to a main chain through a connecting group.

The refractive index of the low refractive index layer of the present invention is preferably not more than 1.46, more preferably from 1.3 to 1.45. A low refractive index layer is preferably formed via a sol-gel method using a silicon alkoxide as one of the coating components. A fluorocarbon resin may also be used to form a low refractive index layer. Specifically preferably, a low refractive index layer is composed mainly of a hot-cured or an ionizing radiation-cured fluorine containing resin and ultra microparticles of silicon oxide. The kinetic friction coefficient of the cured resin is preferably from 0.02 to 0.2 and the contact angle of pure water with the cured resin is preferably from 90 to 130 degrees. A hot-curable or an ionizing radiation-curable fluorine containing resin includes, for example: a silane compound containing perfluoroalkyl group (such as (heptadecafluoro-1,1,2,2-tetradecyl) triethoxysilane) and a fluorine containing copolymer (comprising building units of a cross-linkable monomer and a fluorine containing monomer). Specific examples of a fluorine containing monomer building unit include: hexafluoroethylene, hexafluoropropylene, tetrafluoroethylene, fluoroolefins (such as vinylidenefluorideperfluoro-2,2-dimethyl-1,3-dioxol and fluoroethylene), fluorinated alkyl ester derivative of (meta)acrylic acid (such as BISCOAT 6FM manufactured by OSAKA ORGANIC CHEMICAL INDUSTRY Ltd., M-2020 manufactured by DAIKIN INDUSTRIES, Ltd. and fluorinated vinyl ether series. Examples of a monomer having a cross-linkable group include: an (meta)acrylate monomer having a cross-linkable functional group in the molecule such as glycidyl methacrylate and an (meta)acrylate monomer having a carboxyl group, an amino group, a hydroxyl group or a sulfonic acid group (such as (meta)acrylic acid, methylol (meta) acrylate, hydroxyl (meta)acrylate and allyl acrylate). As disclosed in JP-A 10-25388 and in JP-A 10-147739, a cross-linked structure can also be introduced in a molecule after these monomers have been copolymerized.

In addition to the polymers having above mentioned fluorine containing monomer units, a copolymer together with non-fluorine containing monomer is also preferably used. A monomer unit which may be simultaneously used in the copolymer is not specifically limited, and the examples include: acrylic acid esters (such as methyl acrylate, ethyl acrylate and 2-ethylhexyl acrylate), methacrylic acid esters (such as methyl methacrylate, ethyl methacrylate, butyl methacrylate and ethyleneglycol dimethacrylate), styrene derivatives (styrene, divinylbenzene, α-methylstyrene and vinyltluene), acrylamides (such as N-tertbutyl acrylamide and N-cyclohexyl acrylamide), methacrylamides, acrylonitril derivatives, olefins (such as ethylene, propylene, isoprene, vinylidene chloride and vinyl chloride), vinyl ethers (such as methyl vinyl ether) and vinyl esters (such as vinyl acetate, vinyl propionate and vinyl cinnamate).

Silicon oxide microparticles are preferably mixed in a fluorine containing resin used to form a low refractive index layer in order to improve scratch resistance of the layer. The amount of added silicon oxide microparticles is determined considering both refractive index and scratch resistance. Silicon oxide microparticles may be added to a coating composition as a commercially available silica sol (a dispersed solution of the microparticles in an organic solvent) or as a dispersed solution of commercially available silica microparticles in an organic solvent.

The coating composition of a low refractive index layer in the antireflective film preferably contains a low boiling point solvent as a major part of the solvent. More specifically, the content of the low boiling point solvent (not higher than 100° C.) is preferably more than 50 percent of all the solvent. Thereby, the coated film is rapidly dried even when the coating composition is applied on a rough surface such as the surface an antiglare layer, resulting in reducing minute irregularities of thickness caused by a flow of the coating composition, and also, resulting in reducing a reflectance of the film. On the other hand, a solvent having a boiling point not lower than 100° C. is also preferably used to reduce a unevenness in drying state or an unevenness in turbidity. The content of the high boiling point solvent (not lower than 100° C.) is preferably from 0.5 to 50 percent by weight.

The low boiling point solvent preferably used for the coating composition of a low refractive index layer includes solvents which are selected from the following group and dissolve the solid components of the coating composition, for example: ketones (such as acetone, methyl ethyl ketone), esters (such as methyl acetate and ethyl acetate), ether alcohols (such as methyl cellosolve), alcohols (such as methanol, ethanol and isopropanol). The high boiling point solvent includes, for example: ketones (such as cyclohexanone, cyclopentanone and methyl isobutyl ketone), ether alcohols (such as diacetone alcohol and propylene glycol monomethyl ether) and alcohols (such as 1-butanol and 2-butanol).

A coating method used for coating each layer of the antireflective film includes, for example: a dip coating, an air knife coating, a curtain coating, a roller coating, a wire bar coating, a gravure coating, a micro gravure coating and an extrusion coating.

In the present invention, a method of forming a metal oxide layer by means of plasma discharge treatment is particularly and preferably utilized.

In what follows, a method of forming a metal oxide layer by means of plasma discharge treatment will be explained according to FIGS. 1 and 2.

As a method for forming a metal oxide layer on a hard coat film of the present invention, plasma discharge treatment in atmospheric pressure or in near atmospheric pressure is performed by utilizing a plasma discharge apparatus such as the following.

FIG. 1 illustrates an example of a plasma discharge treatment apparatus to be used for forming a metal oxide layer on the hard coat film of the present invention.

In FIG. 1, the apparatus is provided with a pair of rotating electrodes 10A and 10B, to one of which, an electric source 80 which can apply voltage for generating plasma discharge is connected through a voltage supply device 81, and to another, an earth is connected through 82 which is grounded.

Rotating electrodes 10A and 10B transport a hard coat film by winding, and are preferably roll electrodes or belt-form electrodes. In FIG. 1, roll electrodes are illustrated.

The gap (electrode gap) between the roll electrodes is a place where electric discharge is performed, and is arranged so that hard coat film F can be transported through. The gap between the electrodes forms electric discharge section 50.

The electrode gap is maintained under the atmospheric pressure or a pressure near the atmospheric pressure, and hereto, reactive gas G is supplied from a reactive gas supply section 30 to perform plasma discharge treatment on the surface of hard coat film F.

Herein, after passing through guide roller 20, hard coat film F unwounded from a master roller or hard coat film F having been transported from a previous process is transported first while contacting rotating electrode 10A which is rotating in a transport direction, and then passes through electric discharge section 50 to form a thin layer on the surface of hard coat film F.

Hard coat film F having come out of electric discharge section 50 is U-turned by U-turn rollers 11A to 11D, transported while contacting rotating electrode 10B which is rotating in a direction opposite to the rotation of rotating electrode 10A, and passed through again the aforementioned electric discharge section 50 to form a thin layer by plasma discharge treatment further onto the surface of hard coat film F having been formed with a thin layer previously. The U-turn is performed usually in approximately 0.1 second at shortest and 1 minute at longest.

Reactive gas G having been used for the treatment is exhausted through gas outlet 40 as exhausted gas G'. Reactive gas G is preferably supplied to electric discharge section 50 after being heated to a temperature in a range from ambient temperature to 250° C., preferably from 50 to 150° C., and more preferably from 80 to 120° C.

Further, electric discharge section 50 is preferably equipped with rectifying plate 51 in order to make the flow of reactive gas G and exhausted gas G' smooth as well as to prevent electric discharge section 50 from spreading and generating unnecessary electric discharge between electrodes 10A and 10B, wherein rectifying plate 51 is preferably made of an insulating material.

A thin layer formed on hard coat film F is not shown in the figure. Hard coat film F having being provided with a thin layer on the surface thereof is transported to a direction toward a winding roller (not shown in the figure) or a next process via guide roller 21.

Therefore, hard coat film F is treated with plasma discharge, keeping tight contact with rotating electrodes 10A and 10B and reciprocating in electric discharge section 50.

Incidentally, although not shown in the figure, devices including rotating electrodes 10A and 10B, guide rollers 20 and 21, U-turn rollers 11A to 11D, reactive gas supply section 30, and gas exhausting outlet 40 are preferably surrounded by and installed in a plasma discharge treatment vessel which shields the devices from external field. The diameters of rotating electrodes 10A and 10B are preferably from 10 to 1000 mm and more preferably from 50 to 500 mm. Rotating electrodes having different diameters are also preferably used in combination.

Further, although it is not shown in the figure, a temperature control medium for temperature control of rotating electrodes 10A and 10B is circulated as necessary and the surface temperature of each electrode is controlled to be a predetermined value.

Figure 2:
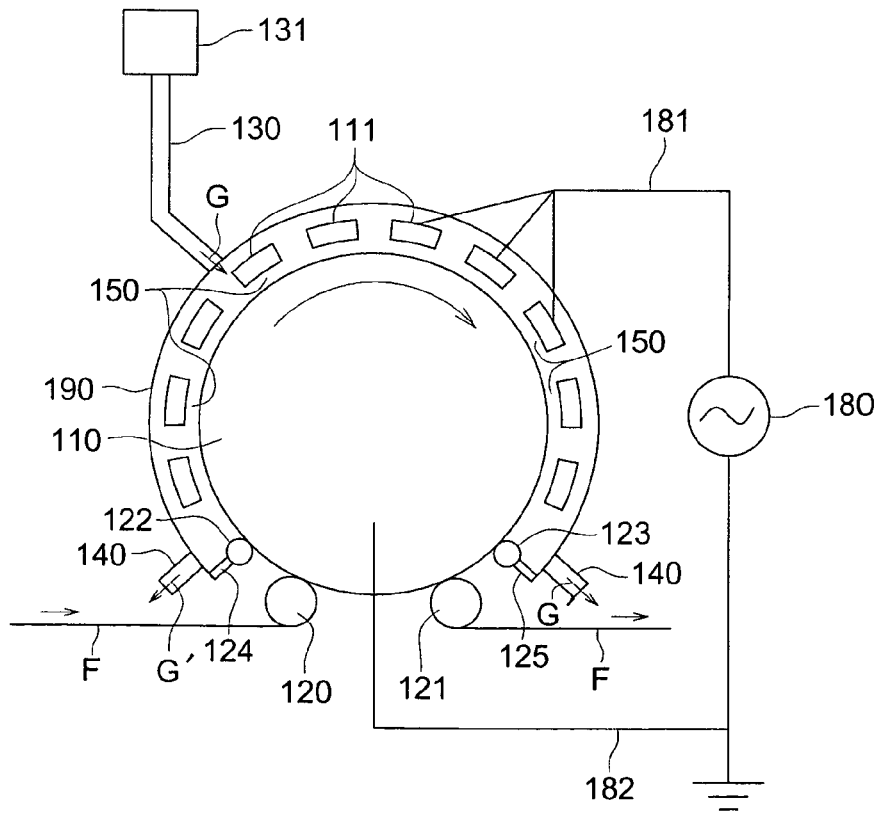
FIG. 2 is a diagram showing an example of a plasma discharger having a useful rotation electrode and fixed electrodes for forming a thin metal oxide layer of the present invention.

FIG. 2 shows an example of a plasma discharge treatment apparatus equipped with a rotating electrode and fixed electrodes which are useful for forming a metal oxide thin layer on a hard coat film of the present invention.

The plasma discharge treatment apparatus is provided with rotating electrode 110 and a plurality of fixed electrodes 111 which are arranged facing rotating electrode 110. Hard coat film F transported from a master roller or from a previous process, which are not shown in the figure, is guided to rotating electrode 110 through a guide roller 120 and a nip roller 122, and further transported in contact with rotating electrode 110, synchronizing with the rotation of rotating electrode 110. Reactive gas G, which is prepared by reactive gas generator 131, is supplied from air supply tube 130 to electric discharge section 150 placed under a pressure of atmospheric pressure or a pressure neat the atmospheric pressure to form a thin layer on the surface of a hard coat film which is facing fixed electrodes 111.

Rotating electrode 110 and fixed electrodes are connected, on one hand, with electric source 180 via voltage supply means 181, and on the other hand, to an earth via 182 which is grounded.

Further, rotating electrode 110, fixed electrodes 111 and electric discharge section 150 are covered with plasma discharge treatment vessel 190 to be shielded against the external field. Exhausted gas G' having been used is exhausted through gas outlet 140 which is placed at the bottom of a treatment chamber.

Hard coat film F which has been treated with plasma discharge is transported to a next process or to a wind-up roller, which is not shown in the figure, via nip roller 123 and guide roller 121.

Partition plates 124 and 125 from the external field are provided at the place of nip rollers 122 and 123 at which hard coat film F enters and exits the plasma discharge treatment vessel, so as to shut out the air which comes in accompanying nip roller 122 and hard coat film F from the external field, and further so as to prevent reactive gas G or exhausted gas G' from escaping to the external field at the outlet. Incidentally, although it is not shown in the figure, a medium, of which temperature is controlled to be used for temperature control of rotating electrodes 110 and fixed electrodes 111, is circulated inside as necessary.

In this manner in the present invention, a hard coat film on which a thin layer is formed is treated with plasma discharge, preferably while being transported on a rotating electrode.

The surface of a rotating electrode where the rotating electrode contacts with a hard coat film is required to have high flatness and smoothness, and a surface roughness of the rotating electrode represented by the maximum height ($R_{max}$) of surface roughness defined by JIS-B-0601 is preferably not greater than 10 μm, more preferably not greater than 8 μm, and particularly preferably not greater than 7 μm. Further, it is necessary to protect electrodes from depositing of dust or foreign matter so that a uniform film is formed.

The surface of an electrode utilized for plasma discharge treatment is desirably covered with a solid dielectric, and particularly, an electric conductive base material such as a metal covered with a solid dielectric is desired. As solid dielectrics, there are plastics such as polytetrafluoroethylene and polyethylene terephthalate, glass, silicon dioxide, metal oxide such as aluminum oxide ($Al_2O_3$), zirconium oxide ($ZrO_2$), and titanium dioxide ($TiO_2$), and double oxides such as barium titanate.

Particularly preferred is a ceramic coated dielectric which is prepared by spraying ceramic on an electric conductive base material and sealing it with use of an inorganic material. Herein, the electric conductive base material may be a metal such as silver, platinum, stainless steel, aluminum, or iron, wherein stainless steel is most preferable in view of manufacturing.

Further, as a lining material, employed are silicate type glass, borate type glass, phosphate type glass, germanate type glass, tellurite type glass, aluminate type glass and vanadate type glass, wherein borate type glass is most preferable in view of manufacturing.

Electrodes used for plasma discharge treatment can be heated or cooled from the inner surface side (inside), as necessary. In case of an electrode is a belt type, it may be cooled by air from inside, however, in case of a rotating electrode employing a roller, temperatures of the surface of the electrode and of a hard coat film are preferably controlled by supplying a medium inside the electrode.

Distilled water, oil, and particularly insulating materials such as silicone oil are used as a medium.

The temperature of a hard coat film at electric discharge treatment is preferably within a range from ambient temperature to 200° C., more preferably from ambient temperature to 120° C., and further preferably from 50 to 110° C.

Further, a lot of curls may be created also by electric discharge due to, for example, a rise in the surface temperature of a film, however, by the present invention, curl creation has been markedly reduced.

It is desirable that temperature unevenness of the hard coat film surface particularly in the lateral direction is not caused by electric discharge treatment, wherein the unevenness is preferably within the range of ±5° C., more preferably within ±1° C., and further preferably within ±0.1° C.

In the present invention, the size of the electrode gap is determined taking into consideration of the thickness of a solid dielectric, applied voltage and frequency, and the purpose of plasma discharge treatment. The shortest distance between a solid dielectric and an electrode in case of providing one solid dielectric as one of the foregoing electrodes, and the distance between each other solid dielectrics in case of providing two solid dielectrics as both of the foregoing electrodes, are preferably within the range from 0.5 to 20 mm and particularly preferably 1±0.5 mm in both cases in view of creating a uniform plasma discharge.

In the present invention, at the electric discharge section at the gap of electrodes, a gas mixture generated in a gas generating device is introduced, with control of the flow rate from a reactive gas supply inlet to the electric discharge section. The concentration and flow rate of a reactive gas are adjusted suitably, wherein the reactive gas is preferably supplied at a sufficient speed for the transportation speed of a hard coat film. It is preferable to set the flow rate and electric discharge conditions so that almost all the reactive gas supplied is consumed at the electric discharge section to react and form a thin layer.

To prevent air in the atmosphere from entering the electric discharge section and a reactive gas from leaking out of the apparatus, it is preferable that the electrodes and the hard coat film during transportation are entirely covered to be shielded from the external field. In the present invention, the pressure of the electric discharge section is maintained at the atmospheric pressure or near the atmospheric pressure. Further, a reactive gas may be decomposed in air-phase and create micro particles of a metal oxide. Therefore, it is preferred to set the flow rate and the electric discharge conditions so as to reduce the creation of micro particles.

Herein, the pressure near the atmospheric pressure means a pressure ranging from 20 to 200 kPa, and preferably from 93 to 110 kPa to suitably obtain the effects described in the present invention. The pressure at the electric discharge section is preferably a pressure which is somewhat positive with respect to the atmospheric pressure outside the apparatus, and more preferably, is atmospheric pressure +0.1 to +5 kPa.

To generate stable plasma, in a plasma discharge treatment apparatus useful for the present invention, it is preferable that one of the electrodes is connected to an electric power source to be applied with voltage and the other electrode is grounded by connecting to an earth.

The voltage value applied to the electrode by a high frequency power source employed in the present invention is suitably determined; for example, the voltage is approximately in the range from 0.5 to 10 kV, the applied frequency is adjusted to the range from 1 kHz to 150 MHz, and the waveform may be a pulse wave or a sine wave. Particularly, it is preferable to tune the frequency to the range higher than 100 kHz and not higher than 50 MHz to obtain a preferable electric discharge section (electric discharge space). Also, a method simultaneously applying high frequency voltages with two different frequencies ranging from 1 kHz to 200 kHz and ranging from 800 kHz to 150 MHz is preferably employed.

Electric discharge density at the electric discharge section is preferably in the range from 5 to 1,000 W·min/m², and particularly from 50 to 500 W·min/m².

Preferably, a plasma discharge treatment section is surrounded suitably by a treatment vessel made of Pyrex glass (R), and a metal vessel also can be used provided that insulation from the electrodes is secured. For example, polyimide resin may be pasted up on the inner surface of an aluminum or stainless steel frame, or the metal frame may be subjected to ceramic coating to secure insulation. Further, the side faces of the electric discharge section and a rotating electrode, and the side face of the hard coat film transportation section may be surrounded to properly supply a reactive gas to the electric discharge section or to exhaust gas from that.

A reactive gas employed in a method for forming a metal oxide thin layer of the present invention will be explained. A reactive gas for forming a thin layer preferably contains nitrogen or a rare gas.

That is, the reactive gas is preferably a gas mixture of nitrogen or a rare gas, and is a reactive gas described below.

Herein, the rare gas consists of Group 18 of the periodic table, concretely, neon, argon, krypton, xenon, radon, etc., and particularly, helium and argon are employed in the present invention. They may be used in a mixture, for example, at a ratio of helium 3 to argon 7.

To generate steady plasma discharge, concentration of a rare gas or nitrogen in the reactive gas is preferably not lower than 90 percent by volume, and more particularly, in the range from 90 to 99.99 percent by volume.

A rare gas or nitrogen is employed to generate steady plasma discharge, and the reactive gas being ionized or radicalized in the plasma is accumulated on or attached to the surface of a base material to form a thin layer.

As the reactive gas useful for the present invention, a gas added with a reactive gas of various substances is used to form thin-layers having various functions on a hard coat film.

For example, using a fluorine-containing organic compound and a silicon compound for the reactive gas, a low refractive-index layer or an antistain layer of an antireflective layer can be formed.

Further, employing an organometallic compound, metal-hydrogen compound, or metal halogenide, which include Ti, Zr, In, Sn, Zn, Ge, Si or other metals, a metal oxide layer or a metal nitride layer can be formed, and these layers may function as a medium refractive index layer or a high refractive-index layer of an antireflective layer, as well as an electric conductive layer or an antistatic layer.

Further, an antistain layer and a low refractive index layer can be formed with a fluorine-containing organic compound, and a gas-barrier layer and a low refractive index layer can be formed with a silicon compound. The present invention is applied preferably, in particular, for preparation of an antireflective layer which is formed by laminating multiple layers of a high, medium, and low refractive index layer.

A metal oxide layer is preferably obtained in a thickness of a range from 1 to 1,000 nm.

In atmospheric pressure plasma treatment, a fluorine-compound-containing layer can also be formed by employing a fluorine-containing organic compound as a source gas.

The fluorine-containing organic compound is preferably a carbon fluoride gas, a hydrocarbon fluoride gas, etc.

Concretely, the fluorine-containing organic compounds can be, for example, a carbon fluoride compound such as carbon tetrafluoride, carbon hexafluoride, tetrafluoroethylene, hexafluoropropyrene, octafluorocyclobutane; a hydrocarbon fluoride compound such as difluoromethane, tetrafluoroethane, tetrafluoropropyrene, trifluoropropyrene, octafluorocyclobutane; further, a halogenide of a hydrocarbon fluoride compound such as monochlorotrifluoromethane, monochlorodifluoromethane, dichlorotetrafluorocyclobutane; or a fluoride-substituent of an organic compound of alcohol, acid, ketone, etc. However, the present invention is not limited to these.

They may be used alone or in mixture.

Further, these compounds may include an ethylenically unsaturated group in a molecule.

In case of employing a fluorine-containing organic compound as the reactive gas, the content of a fluorine-containing organic compound as the reactive gas in the reaction gas is preferably in the range from 0.01 to 10 percent by volume and more preferably 0.1 to 5 percent by volume, in view of forming a uniform thin layer on a hard coat film by plasma discharge treatment.

Further, in case that a fluorine-containing organic compound, which is employed preferably, is in a gas state in an ordinary temperature and pressure, it can be used as it is as a component of a reactive gas.

Further, in case that the fluorine-containing organic compound is liquid or solid in an ordinary temperature and pressure, it may be vaporized by vaporizing means such as heating or reducing of pressure, or dissolved in a suitable organic solvent, to be used.

Preferably, a useful silicon compound as a reactive gas, for example, is an organometallic compound such as dimethylsilane, tetramethylsilane; a metal hydrogen compound such as monosilane, disilane; a metal halogenide compound such as dichlorosilane, trichlorosilane, tetrafluorosilane; an alkoxy silane such as tetramethoxy silane, tetraethoxy silane, tetraisopropoxy silane, dimethyldiethoxy silane, methyltrimethoxy silane, ethyltriethoxy silane; or an organosilane, etc., however, the present invention is not limited thereto.

Further, these can be used in proper combinations. Another organic compounds may also be added to change or control the physical properties of a layer.

In case of using a silicon compound as the reactive gas, a content of a silicon compound as the reactive gas in the reaction gas is preferably in the range from 0.01 to 10 percent by volume and more preferably 0.1 to 5 percent by volume, in view of forming a uniform thin layer on a hard coat film by plasma discharge treatment.

A useful organometallic compound as the reactive gas is not particularly limited and can be an organometallic compound to form metal oxides, such as Al, As, Au, B, Bi, Sb, Ca, Cd, Cr, Co, Cu, Fe, Ga, Ge, Hg, In, Li, Mg, Mn, Mo, Na, Ni, Pb, Pt, Rh, Se, Si, Sn, Ti, Zr, Y, V, W or Zn.

For example, to form a high refractive index layer of an antireflective layer, a titanium compound is preferred, the titanium compound being, for example, an organic amino metallic compound such as tetradimethylamino titanium, a metal hydrogen compound such as monotitanium or dititanium, a metal halogenide such as dichlorotitanium, trichlorotitanium, or tetrachlorotitanium, or a metal alkoxide such as tetraethoxy titanium, tetraisopropoxy titanium, or tetrabutoxy titanium.

The silicon compound or an organometallic compound described above is preferably a metal hydrogen compound or a metal alkoxide in view of handling, and particularly, a metal alkoxide is used because of no creation of a corrosive or poisonous gas and minimal contamination in the process.

In case of empolying an organometallic compound as the reactive gas, a content of an organometallic compound as the reactive gas in the reaction gas is preferably in the range from 0.01 to 10 percent by volume and more preferably 0.1 to 5 percent by volume, in view of forming a uniform thin layer on a hard coat film by plasma discharge treatment.

Further, to introduce a metal compound such as a silicon compound or a titanium compound to the electric discharge section, both of them can be used in any state of gas, liquid or solid in an ordinary temperature and pressure.

In case of gas, the metal compound can be introduced to the electric discharge section as it is, however, in case of liquid or solid, the metal compound can be used after vaporizing by vaporization means such as heating, reducing of pressure, or ultrasonic irradiation.

In case of employing a metallic compound such as a silicon compound or a titanium compound after vaporizing by heating, a metal alkoxide such as tetraethoxy silane or tetraisopropoxy titanium which are liquid at an ordinary temperature and has a boiling point not higher than 200° C. is preferred to form a metal oxide thin layer of the present invention. The metal alkoxide described above may be used by diluting with an organic solvent, wherein methanol, ethanol, n-hexane, or a mixed organic solvent thereof can be used as the organic solvent.

Further, physical properties such as hardness and density of a thin layer can be controlled by providing oxygen, hydrogen, carbon dioxide, carbon monoxide, nitrogen, nitrogen dioxide, nitrogen monoxide, water, etc. in the reactive gas at a content of from 0.1 to 10 percent by volume.

An amorphous metal oxide layer of silicon oxide, titanium oxide, or the like can be preferably prepared according to the foregoing method.

A hard coat film of the present invention can be preferably used for, for example, an optical film having an antireflective layer comprised of a low refractive index layer and a high refractive index layer laminated with each other, or an optical film having an electric conductive layer or an antistatic layer.

In the present invention, multiple thin layers can be formed continuously, and also, a multi-layer laminate free from unevenness of thin layers can be formed, by providing a plurality of plasma discharge apparatuses.

For example, in case of preparing an antireflective film having an antireflective layer on a hard coat film thereof, it can be prepared efficiently by continuously accumulating a high refractive index layer having a refractive index ranging from 1.6 to 2.3 and a low refractive index layer having a refractive index ranging from 1.3 to 1.5 on the surface of the hard coat film.

A preferable low refractive index layer is a fluorine-containing compound layer which is formed by plasma discharge treatment of a gas containing a fluorine-containing organic compound, or a layer containing mainly silicon oxide which is formed by plasma discharge treatment of an organic silicon compound such as alkoxysilane. A preferable high refractive index layer is a metal oxide layer which is formed by plasma discharge treatment of a gas containing an organic metal compound, for example, a layer having titanium oxide or zirconium oxide.

There are provided thin layer forming methods described above, however, the present invention is not limited thereto, and neither is the layer composition limited thereto. For example, an antistain layer may be formed on the outermost surface by plasma discharge treatment with a presence of a fluorine-containing organic compound gas and in the atmospheric pressure or near the atmospheric pressure.

In the present invention, according to the method described above, multiple layers can be laminated together to obtain a uniform antireflective film free from uneven thickness of each layer.

(Polarizing Plate)

A polarizing plate of the present invention will be described below.

A polarizing plate of the present invention can be produced by an ordinary method. It is preferable that the rear surface side of a hard coat film of the present invention is subjected to alkaline saponification processing, and then the processed hard coat film is stuck to at least one surface of a polarizing film produced by immersion expansion in iodine solution with complete saponification polyvinyl alcohol solution. The other surface of the polarizing film may also be pasted with this hard coat film or it may be pasted with another polarizing plate protection film. In this case, while one surface is pasted with a hard coat film of the present invention, the polarizing plate protection film applied to the other surface preferably has a phase difference of an in-plane retardation $R_0$ ranging from 20 to 70 nm and a retardation in the thickness direction $R_t$ ranging from 100 to 400 nm, measured at 590 nm. Such a film can be produced by a method disclosed in JP-A 2002-71957 or Japanese Patent Application No. 2002-155395. Further, preferably used is a polarizing plate protection film that serves also as an optical compensation film having an optically anisotropic layer formed by aligning a liquid crystal compound such as discotic liquid crystals. For example, an optically anisotropic layer can be formed by a method disclosed in JP-A 2003-98348. Utilizing a combination of such a polarizing plate protection film and the hard coat film of the present invention gives a polarizing plate which is excellent in flatness and has a stable effect of enlarging a viewing angle.

A polarizing film, which is a prime element that constructs a polarizing plate, is a device that transmits only light in one certain direction through a polarizing face. Typical polarizing films currently known are polyvinyl alcohol type polarizing films, which include those dyed with iodine and those dyed with a dichromatic dye. Currently used polarizing films are produced in such a way that a polyvinyl alcohol solution is formed into a film, then, the film is uniaxially stretched and then dyed, or the formed film is dyed first and then uniaxially stretched. Thereafter, the film is preferably subjected to durability processing with a boron compound. One surface of the hard coat film of the present invention is stuck on the surface of the polarizing film to form a polarizing plate, preferably with a water type adhesive primarily composed of completely saponified polyvinyl alcohol etc.

Polarizing plates using a conventional hard coat film were poor in terms of flatness, and an image reflected therefrom showed minute wavy irregularities, wherein pencil hardness grade was only 2 H or so, and the wavy irregularities was increased in a durability test under the conditions of 60° C. and 90% RH. On the other hand, a polarizing plate with the use of a hard coat film of the present invention had high flatness and high pencil hardness. Further, even in a durability test under the conditions of 60° C. and 90% RH, the wavy irregularities did not increase.

(Display Apparatus)

By incorporating a polarizing plate of the present invention into a display apparatus, a display apparatus, of the present invention, having various aspects of high visibility can be produced. Hard coat films of the present invention are preferably used in reflection types, transparent types, and semi-transparent types of LCDs, and also preferably used in LCDs, with various driving systems, such as TN type, STN type, OCB type, HAN type, VA type, IPS type, etc. Further, antireflective films for which an antireflective layer is formed on its hard coat film of the present invention cause extremely slight color shading of reflected lights on the antireflective layer and excel in flatness, and therefore, are preferably used in various types of display apparatuses such as plasma displays, field emission displays, organic EL displays, inorganic EL displays, and electronic papers. Particularly, while images of fluorescent lamps reflected on a display apparatus with a large screen not smaller than a 30-inch type had distortion due to color shading or wavy irregularities, reflected images on display apparatuses of the present invention are free from distortion as in the case of reflection by mirrors, having an effect of preventing eyestrains even for long time viewing.

EXAMPLE

The present invention will be specifically described as follows, referring to embodiment, to which, however, the present invention is not limited.

[Preparation of Cellulose Ester Film]

Cellulose esters, plasticizers, UV absorbers, particles, and solvents shown in Table 1 are used to prepare cellulose ester solutions of dope compositions as shown in Table 2.

TABLE 1

| | Substituion degree | Mn | Mw/Mn |
|---|---|---|---|
| Cellulose ester | | | |
| A | Acetyl group substitution degree 2.9 | 160000 | 1.8 |
| B | Acetyl group substitution degree 2.8 | 150000 | 2 |
| C | Acetyl group substitution degree 2.8 | 100000 | 2.1 |
| D | Acetyl group substitution degree 2.8 | 90000 | 3.5 |
| E | Acetyl group substitution degree 2.7 | 110000 | 2.4 |
| F | Acetyl group substitution degree 2.0 Propionyl group substitution degree 0.8 | 100000 | 2.1 |
| G | Acetyl group substitution degree 1.9 Propionyl group substitution degree 0.75 | 90000 | 2.2 |
| H | Acetyl group substitution degree 1.9 Propionyl group substitution degree 0.85 | 80000 | 2.5 |
| I | Acetyl group substitution degree 1.88 Propionyl group substitution degree 0.7 | 70000 | 3.1 |
| J | Acetyl group substitution degree 2.5 | 80000 | 3.1 |
| Plasticizer | | | |
| A | Trimethylolpropane tribenzoate (polyalcohol ester) | | |
| B | Tripropyren glycoldibenzoate (polyalcohol ester) | | |
| C | Ethylphthalyl ethylglycolate | | |
| D | Dicyclohexyl terephthalate | | |
| E | Acetyltrimethyl citrate | | |
| F | Triphenyl phosphate | | |
| UV absorber | | | |
| A | TINUVIN 109 (manufactured by Chiba Specialty Chemicals Co.) | | |
| B | TINUVIN 171 (manufactured by Ciba Specialty Chemicals Co.) | | |
| C | 2-hydroxy-4-benzyloxy benzophenone | | |
| D | Compound D | | |
| Particle | AEROSIL R972V (manufactured by Nippon Aerosil Co., Ltd.) | | |
| Solvent | | | |
| A | Methylene chloride 440 kg, ethanol 35 kg | | |

TABLE 1-continued

| | Substituion degree | Mn Mw/Mn |
|---|---|---|
| B | Methylene chloride 400 kg, ethanol 75 kg | |
| C | Methyl acetate 330 kg, ethanol 145 kg | |

Compound D

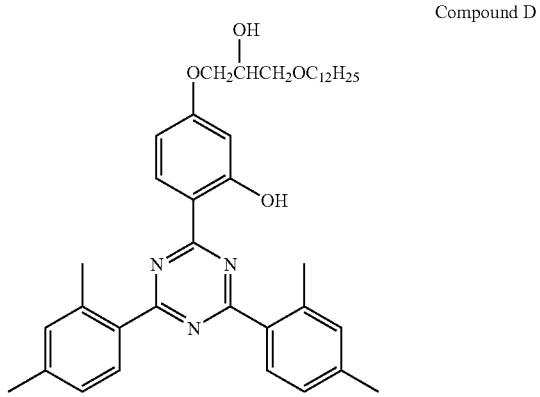

Compound D

Specifically, a solvent was placed in a tightly sealed container, then, other materials were placed in the vessel successively, while stirred, and heated and stirred to be completely dissolved and mixed. Particles were dispersed with a portion of the solvent and thus added. The solution was cooled down to the temperature of flow-casting, left standing over a night, subjected to defoaming processing, and filtered employing Azumi filter paper No. 244, produced by Azumi Roshi Co., Ltd. Thus, each cellulose ester solution was obtained.

Next, the cellulose ester solution having been adjusted to a temperature of 33° C. was conveyed to a die and uniformly flow-cast from a die slit onto a stainless steel belt. The flow-casting section of the stainless steel belt was heated from the rear side with warm water having a temperature of 37° C. After the solution having being flow-cast, a dope film thus prepared (referred to as a web after flow-casting on the stainless steel belt) on the metal support was brought into contact with warm air having a temperature of 44° C. and thus dried; the web was peeled from the metal support with the residual solvent content thereof 120 percent by weight; tension was applied to the web when the web was peeled so that the web was stretched to a predetermined longitudinal stretching magnification; and then, edges of the web were held by a tenter so that the web was stretched to a stretching magnification, shown in the table, in the lateral direction. After having being stretched, the web was held for several seconds with its width remained the same; the tension in the lateral direction was reduced; then, the lateral holds were released; and further, the web was transported for 20 minutes in a third drying zone, set to a temperature of 125° C., to be dried. Thus, cellulose ester films No. 1 to 27 each, having a width ranging from 1.4 to 2 m, a predetermined film thickness, and knurls which are 1.5 cm wide and 8 μm high at the edges, were prepared.

Regarding the prepared cellulose ester films, the employed cellulose esters, plasticizers, UV absorbers, etc., also, stretching maginifications of the webs, thicknesses of the prepared films, and the widths of the formed film are shown in Table 2.

TABLE 2

| Cellulose ester film No. | Dope composition | | | | | | Solvent | Stetching magnification | | Film thickness (μm) | Width (m) | |
|---|---|---|---|---|---|---|---|---|---|---|---|---|
| | Cellulose ester | Plasticizer | | UV absorber | | Particle | | Longitudinal stretching magnification just after peeling | Lateral stretching magnification | | | |
| 1 | A (100 kg) | A (5 kg) | C (5 kg) | — | A (1 kg) | B (1 kg) A (0.3 kg) | A | ×1.1 | ×1.1 | 50 | 1.5 | Inv. |
| 2 | A (100 kg) | A (5 kg) | D (5 kg) | — | A (1 kg) | B (1 kg) A (0.3 kg) | A | ×1.1 | ×1.1 | 50 | 1.5 | Inv. |
| 3 | A (100 kg) | A (5 kg) | E (5 kg) | — | A (1 kg) | B (1 kg) A (0.3 kg) | A | ×1.1 | ×1.1 | 50 | 1.5 | Inv. |
| 4 | A (100 kg) | B (5 kg) | C (5 kg) | — | D (1 kg) | — A (0.3 kg) | A | ×1.1 | ×1.1 | 50 | 1.5 | Inv. |
| 5 | A (100 kg) | B (5 kg) | D (5 kg) | — | A (1 kg) | B (1 kg) A (0.3 kg) | A | ×1.1 | ×1.1 | 50 | 1.5 | Inv. |
| 6 | A (100 kg) | B (5 kg) | E (5 kg) | — | A (1 kg) | B (1 kg) A (0.3 kg) | A | ×1.1 | ×1.1 | 50 | 1.5 | Inv. |
| 7 | A (100 kg) | A (3 kg) | B (2 kg) | C (4 kg) | A (1 kg) | B (1 kg) A (0.3 kg) | A | ×1.1 | ×1.1 | 50 | 1.5 | Inv. |
| 8 | A (100 kg) | A (5 kg) | C (6 kg) | — | A (1 kg) | B (1 kg) A (0.3 kg) | A | ×1.06 | ×1.06 | 30 | 1.4 | Inv. |
| 9 | A (100 kg) | A (5 kg) | C (6 kg) | — | A (1 kg) | B (1 kg) A (0.3 kg) | A | ×1.1 | ×1.1 | 40 | 1.5 | Inv. |
| 10 | A (100 kg) | A (5 kg) | C (6 kg) | — | A (1 kg) | B (1 kg) A (0.3 kg) | A | ×1.1 | ×1.1 | 60 | 1.5 | Inv. |
| 11 | A (100 kg) | A (5 kg) | C (6 kg) | — | A (1 kg) | B (1 kg) A (0.3 kg) | A | ×1.1 | ×1.1 | 80 | 1.5 | Inv. |
| 12 | C (100 kg) | A (6 kg) | C (6 kg) | — | A (1 kg) | B (1 kg) A (0.3 kg) | A | ×1.1 | ×1.1 | 50 | 1.5 | Inv. |
| 13 | E (100 kg) | A (6 kg) | C (6 kg) | — | C (1 kg) | — A (0.3 kg) | B | ×1.1 | ×1.1 | 50 | 1.5 | Inv. |
| 14 | F (100 kg) | A (6 kg) | C (6 kg) | — | A (1 kg) | B (1 kg) A (0.3 kg) | C | ×1.1 | ×1.1 | 50 | 1.5 | Inv. |
| 15 | F (100 kg) | A (5 kg) | D (5 kg) | — | A (1 kg) | B (1 kg) A (0.3 kg) | B | ×1.1 | ×1.1 | 50 | 1.5 | Inv. |
| 16 | G (100 kg) | A (6 kg) | C (6 kg) | — | A (1 kg) | B (1 kg) A (0.3 kg) | B | ×1.1 | ×1.1 | 50 | 1.5 | Inv. |
| 17 | H (100 kg) | A (6 kg) | C (6 kg) | — | A (1 kg) | B (1 kg) A (0.3 kg) | B | ×1.1 | ×1.1 | 50 | 1.5 | Inv. |
| 18 | A (100 kg) | A (5 kg) | C (5 kg) | — | A (1 kg) | B (1 kg) A (0.3 kg) | A | ×1.1 | ×1.1 | 60 | 2 | Inv. |
| 19 | D (100 kg) | A (6 kg) | C (6 kg) | — | A (1 kg) | B (1 kg) A (0.3 kg) | A | ×1.03 | ×1.03 | 50 | 1.5 | Comp. |
| 20 | I (100 kg) | A (6 kg) | C (6 kg) | — | A (1 kg) | B (1 kg) A (0.3 kg) | B | ×1.1 | ×1.1 | 50 | 1.5 | Comp. |
| 21 | J (100 kg) | A (6 kg) | C (6 kg) | — | A (1 kg) | B (1 kg) A (0.3 kg) | B | ×1.1 | ×1.1 | 50 | 1.5 | Comp. |
| 22 | A (100 kg) | A (5 kg) | F (5 kg) | — | A (1 kg) | B (1 kg) A (0.3 kg) | A | ×1.1 | ×1.1 | 50 | 1.5 | Comp. |
| 23 | A (100 kg) | A (5 kg) | C (5 kg) | F (5 kg) | A (1 kg) | B (1 kg) A (0.3 kg) | A | ×1.1 | ×1.1 | 50 | 1.5 | Comp. |
| 24 | A (100 kg) | B (5 kg) | F (1 kg) | — | A (1 kg) | B (1 kg) A (0.3 kg) | A | ×1.1 | ×1.1 | 50 | 1.5 | Comp. |
| 25 | A (100 kg) | F (12 kg) | — | — | A (1 kg) | B (1 kg) A (0.3 kg) | A | ×1.1 | ×1.1 | 50 | 1.5 | Comp. |
| 26 | A (100 kg) | F (12 kg) | — | — | A (1 kg) | B (1 kg) A (0.3 kg) | A | ×1.1 | ×1.1 | 50 | 1.5 | Comp. |
| 27 | A (100 kg) | A (5 kg) | C (5 kg) | — | A (1 kg) | B (1 kg) A (0.3 kg) | A | no stretching | ×1.03 | 50 | 1.5 | Comp. |

Inv.: Present invention
Comp.: Comparison

[Preparation of Hard Coat Film]

<<Coating of Hard Coat Layer>>

A coating solution for a hard coat layer (UV curing resin layer) described below was filtered with a filter made of polypropylene with a hole-diameter of 0.4 μm, and prepared on the surface of each of the cellulose ester films No. 1 to 27. The prepared coating solution for a hard coat layer was coated using a micro gravure coater and dried at a temperature of 90° C. Then, the coated layer thus prepared was cured, using a UV lamp in an exposure dose of 50 mJ/cm² at an exposure intensity of 100 mW/cm² at an exposure section, and thereby, was formed into a hard coat layer with a thickness of 6 μm. Exceptionally, the cellulose ester films No. 11 and 26, No. 22 to 24, and No. 25 and 27, were cured in respective exposure doses of 100-mJ/cm², 120-mJ/cm², and 150-mJ/cm². Thus, the hard coat films No. 1 to 27 described in Table 3 were produced.

<Coating Solution for Hard Coat Layer>
Dipentaerythritol hexaacrylate
  100 weight parts
Photoreaction initiator (Irgacure 184 (manufactured by Chiba Specialty Chemicals Co.) 4 weight parts
Ethyl acetate 75 weight parts
Propylene glycol monomethyl ether 75 weight parts silicon compound (BYK-307 (manufactured by BYK Chemie Japan KK)) 0.5 weight parts Further, the above coating solution for a hard coat layer was coated on cellulose ester films selected from items No. 1, and No. 8 to 11, which had been prepared as above, with variation of the thickness (H) of the hard coat layer in the range from 2 to 10 μm (which also means variation of the ratio (d/H) between the thickness (H) of a hard coat layer and the film thickness (d) of a cellulose ester film) as shown in Table 4, and thus hard coat films No. 28 to 44 were produced as well, wherein the hard coat layers were cured in a UV exposure dose of 50 mJ/cm².

Further, cellulose ester films selected from items No. 1 and 9, which had been prepared as above, were employed, and after coating the above coating solution for a hard coat layer on these cellulose ester films such that the thickness of the dry films becomes 7 μm, the hard coat layers were cured with variation of the exposure intensity by the UV lamp ranging from 20 to 200 mW/cm², as described in Table 5, and also with a change of the exposure time from that of the previous case, thereby the UV exposure dose was unchanged from 50 mJ/cm². In this way, hard coat films No. 45 to 52 were produced.

[Evaluation]

The optical films, prepared as above, were evaluated for the items described below.

<<Flatness Index; Evaluation of Tiny Irregularities>>

The films were scanned in the lateral direction with a laser displacement gage (manufacturer: Keyence Corporation, Model No.: LT-8100, resolution: 0.2 µm) to measure tiny irregularities on the surface, and thus the flatness of each hard coat film was evaluated.

The measurement was performed in such a way that a film was placed on a flat and horizontal table; both lateral ends of the film were fixed to the table with adhesive tapes; a measuring camera was set on a transportation rail (manufactured by SIGMA KOKI CO., LTD.) that was arranged parallel to the table such that the distance between the camera lens and the sample film was 25 mm; and the film was scanned at a moving speed of 5 cm/minute to be measured. The measured values represent the state and the scale of tiny irregularities on the surface of each film.

A: Irregularities caused by deformation of the film are smaller than 0.5 µm.
B: Irregularities caused by deformation of the film are equal to or greater than 0.5 µm, and smaller than 1.0 µm.
C: Irregularities caused by deformation of the film are equal to or greater than 1.0 µm, and smaller than 3.0 µm.
D: Irregularities caused by deformation of the film are equal to or greater than 3.0 µm.

<<Flatness; Visual Evaluation>>

Each sample of films was cut out in a size of 90 cm in width and 100 cm in length; 5 units of 50 W fluorescent lamps were fixed at a height of 1.5 m to illuminate the table surface at 45 degrees from the table surface; each sample was placed on the table; and then, irregularities reflecting on the surface of the film were visually observed for the following determination. This method allows determination on "distortions" and "streaks".

A: All the five fluorescent lamps looked straight.
B: Some portions of the fluorescent lamps looked slightly distorted.
C: The entire fluorescent lamps looked distorted a little.
D: The fluorescent lamps looked highly wavy.

<<Unevenness Of Pencil Hardness in Lateral Direction>>

Hardness test was carried out, using pencils of different hardnesses and conforming to the testing method specified by JIS K5400, with an applied load of 1 kg. Each hard coat film was divided into 10 sections in the lateral direction for measurement of pencil hardness at the respective positions.

Unevenness in the lateral direction was evaluated with the criteria below.

A: No variation in the lateral direction was detected.
B: There was a tendency that evenness was lower at ends in the lateral direction.

<<Durability Against Scratches>>

Steelwool of #0000 was reciprocated 10 times on the surface of the hard coat layer with a load of 1000 g applied; a black tape was brought in close contact with the rear surface, and thereby, the presence or absence of scratches was visually observed by a green lamp, thus determining the quantity of scratches per 1 $cm^2$.

The evaluation results of the hard coat films 1 to 27 are shown in Table 3. The results proved that hard coat films of the present invention had high hardness and durability against scratching as well as high flatness.

The evaluation results of the hard coat films 28 to 44 which were produced varying the layer thicknesses of a hard coat and the thickness of a cellulose ester film are shown in Table 4. The results proved that the hard coat films, in particular, with a thickness of the cellulose ester film ranging from 10 to 70 µm, and with a ratio d/H between the layer thickness H of an actinic ray curable resin and the thickness d of the cellulose ester film ranging from 4 to 10, have high hardness and durability against scratching as well as flatness.

Also, there are shown in Table 5 the evaluation results of the hard coat films 45 to 52 produced by varying the exposure intensity by the UV lamp and the thickness of a cellulose ester film. Particularly, hard coat films cured with exposure intensity at the actinic ray exposure section ranging from 50 to 150 $mW/cm^2$ proved to have high hardness and durability against scratching as well as high flatness. Further, because of high hardness despite lower exposure intensity applied, the hard coat films 45 to 52 had an extremely high productivity on a production line.

[Preparation of Antireflective Film]

An antireflective layer was formed on each hard coat film prepared above.

A coating solution for a medium refractive index layer described below was coated on each of the hard coat films No. 1 to 52, using a bar coater, then dried at an temperature of 70° C., and thereafter the coated layer was cured by projecting UV ray to form a medium refractive index layer (refractive index 1.72, thickness 80 nm). Further, coat solution for a high refractive index layer described below was coated thereon, using a bar coater, then dried at an temperature of 70° C., and thereafter the coated layer was cured by projecting UV ray to form a high refractive index layer (refractive index 1.9, thickness 70 nm). Still further, coat solution for a low refractive index layer described below was coated thereon, using a bar coater, then dried at an temperature of 70° C., and thereafter the coated layer was hot-cured to form a low refractive index layer (refractive index 1.45, thickness 95 nm). Thus, antireflective films No. 1 to 52 exhibiting visible light reflectances of not more than 0.5 percent were produced.

<Preparation of a Medium Refractive Index Layer/a High Refractive Index Layer/a Low Refractive Index Layer>

(Preparation of Titanium Dioxide Dispersion)

Titanium oxide (primary particle weight average diameter: 50 nm, refractive index: 2.70) of 30 weight parts, 4.5 weight parts of an anionic diacrylate monomer (PM21, manufactured by Nippon Kayaku Co., Ltd.), 0.3 weight parts of a cationic methacrylate monomer (DMAEA, manufactured by Kojin Co., Ltd.) and 65.2 weight parts of methyl ethyl ketone were dispersed by a sand grinder to prepare a titanium dioxide dispersion.

(Preparation of a Coating Solution for a Medium Refractive Index Layer)

A photopolymerization initiator (Irgacure 907, manufactured by Chiba Geigy Co.) of 0.14 g and a photosensitizer (Kayacure DETX, manufactured by Nippon Kayaku Co., Ltd.) of 0.04 g were dissolved in 151.9 g of cyclohexanone and 37.0 g of methyl ethyl ketone. Further, after being added with 6.1 g of the foregoing titanium dioxide dispersion, and 2.4 g of a mixture of dipentaerythritol pentaacrylate and dipentaerythritol hexaacrylate (DPHA, manufactured by Nippon Kayaku Co., Ltd.), and stirred at ambient temperature for 30 minutes, the solution was filtered through a polypropyrene filter having a pore size of 0.4 µm to prepare a coating solution for a medium refractive index layer. The coating solution was coated on a cellulose ester film, dried, then cured by UV ray, and thereafter, refractive index was measured resulting in a medium refractive index layer having a refractive index of 1.72.

(Preparation of a Coating Solution for a High Refractive Index Layer)

A photopolymerization initiator (Irgacure 907, manufactured by Ciba Geigy Co.) of 0.06 g and a photosensitizer (Kayacure DETX, manufactured by Nippon Kayaku Co., Ltd.) of 0.02 g were dissolved in 1152.8 g of cyclohexanone and 37.2 g of methyl ethyl ketone. Further, increased were the ratio of the foregoing titanium dioxide dispersion and ratio of the titanium dioxide dispersion of the mixture of dipentaerythritol pentaacrylate and dipentaerythritol hexaacrylate (DPHA, manufactured by Nippon Kayaku Co., Ltd.), so as to adjust the refractive index to match a high index refractive index layer. After being stirred at ambient temperature for 30 minutes, the solution was filtered through a polypropyrene filter having a pore size of 0.4 μm to prepare a coating solution for a high refractive index layer. The coating solution was coated on a cellulose ester film, dried, then cured by UV ray, and thereafter, refractive index was measured resulting in a high refractive index layer having a refractive index of 1.9.

(Preparation of a Coating Solution for a Low Refractive Index Layer)

Silane coupling agent (KBM-503, manufactured by Shinetsu Silicone Co., Ltd.) of 3 g and 0.1 M/L hydrochloric acid of 2 g were added to 200 g of a methanol dispersion solution of silica microparticles having a mean particle diameter of 15 nm (Methanol silica sol, manufactured by Nissan Kagaku Co., Ltd.), and after being stirred at ambient temperature for 5 hours, the solution was kept standing for three days to obtain a dispersion of silica microparticles having been subjected to silane coupling treatment. Isopropyl alcohol of 58.35 g and diacetone alcohol of 39.34 g were added to 35.04 g of the dispersion. Further, the solution was added with another solution, in which 1.02 g of a photopolymerization initiator (Irgacure 907, manufactured by Chiba Geigy Co.) and 0.51 g of a photosensitizer (Kayacure DETX, manufactured by Nippon Kayaku Co., Ltd.) were dissolved in 772.85 g of isopropyl alcohol; also added with 25.6 g of a mixture of dipentaerythritol pentacrylate and dipentaerythritol hexacrylate (DPHA, manufactured by Nippon Kayaku Co., Ltd.) to be dissolved. The obtained solution of 67.23 g was added to a mixture of the foregoing dispersion, isopropyl alcohol, and diacetone alcohol. The mixture was stirred at ambient temperature for 20 minutes and filtered through a polypropyrene filter having a pore size of 0.4 μm to prepare a coating solution for a low refractive index layer. The coating solution was coated on a cellulose ester film, dried, then cured by UV ray, and thereafter, refractive index was measured resulting in a low refractive index layer having a refractive index of 1.45.

Polarizing plates were prepared employing the respective antireflective films.

[Preparation of Polarizing Plate]

A polyvinyl alcohol film having a thickness of 120 μm was uni-axially stretched (at a temperature of 110° C. and a stretching magnification of ×5). This was immersed in an aqueous solution containing 0.075 g of iodine, 5 g of potassium iodide, and 100 g of water for 60 seconds, and then immersed in an aqueous solution containing 6 g of potassium iodide, 7.5 g of boric acid, and 100 g of water. This was washed with water and dried to obtain a polarizing film.

Next, according to the processes 1 to 5 below, the polarizing film was laminated with the above antireflective film and a cellulose ester film on the rear side, to be prepared as a polarizing plate. As a protecting film of the polarizing film, a cellulose ester film having a phase difference (in measurement at 590 nm, in-plane retardation $R_0$=43 nm, retardation in thickness direction Rt=135 nm) was employed for each polarizing plate.

Process 1: A cellulose ester film was immersed in sodium hydroxide solution with a concentration of 2 mol/L and a temperature of 60° C. for 90 seconds, then washed with water, and saponified on the side thereof to be laminated with the polarizing film.

On the other hand, the hard coat film formed with the antireflective layer was subjected to the saponification processing described above, while the surface thereof on the side of the antireflective layer was protected against alkali by a stuck polyethylene film that is peelable.

Process 2: The polarizing film was immersed, for one second or two, in a tank of a polyvinyl alcohol adhesive containing solids of 2 percent by weight.

Process 3: The polarizing film was softly wiped to remove excessive adhesives stuck on the polarizing film in Process 2, then placed on the cellulose ester film processed in Process 1, and further, the antireflective film was laminated on the polarizing film with the antireflective layer of the hard coat film facing outward.

Process 4: Excessive adhesive and foams were removed by a hand roller from the ends of the laminate composed of the antireflective film, the polarizing film, and the cellulose ester film sample, which had been laminated in Process 3, and then these films were stuck together. The pressure of the hand roller was set within the rage from 20 to 30 N/cm2, and the roller speed was set to 2 m/minute approximately.

Process 5: The sample, prepared in Process 4 by sticking the polarizing film, the cellulose ester film, and the antireflective film together, was dried in a drier at a temperature of 80° C. for 2 minutes to prepare a polarizing plate. Polarizing plates No. 1 to 52 were thus prepared employing the respective antireflective films No. 1 to 52.

[Preparation of Liquid Crystal Display]

A liquid crystal panel for which a viewing angle was to be measured was prepared in the following way, and properties as a liquid crystal display were evaluated.

Polarizing plates having been stuck to both the surfaces of each of 15-inch type displays VL-150SD manufactured by Fujitsu Ltd. were peeled, and each of the polarizing plates 1 to 52 prepared above was stuck to the respective glass surface of a respective liquid crystal cell.

Regarding the direction of sticking the polarizing plates, each of the liquid crystal displays No. 1 to 52 was prepared such that the surface of the optical compensation film (phase difference film) was positioned on the part of the liquid crystal cell, and that the absorption axis pointed to the same direction as that of the previously stuck polarizing plate.

[Evaluation]

<<Evaluation of Visibility>>

Each of liquid crystal displays thus obtained was left for 100 hours under conditions of 60° C. and 90% RH, and was returned into conditions of 23° C. and 55% RH. As a result, the surfaces of the displays using the antireflective films formed on the hard coat films of the present invention were found to be superior in flatness, while on the polarizing plates of the comparative examples, minute wavy irregularities were observed, which may cause slight eye strain.

A: No wavy irregularities are observed on the surface.
B: Very slight wavy irregularities are observed on the surface.
C: Minute wavy irregularities are faintly observed on the surface.
D: Minute wavy irregularities are observed on the surface.

<<Evaluation of Reflected Color Shading>>

For each liquid crystal display, the screen was set to black display, and color shading on the surface was visually evaluated.

A: No color shading is observed in reflected lights, and black looks tight.
B: Color shading is slightly observed in reflected lights.
C: Color shading is observed in reflected lights, which is not a practical problem.
D: Color shading observed in reflected lights is annoying.

Evaluation results on the above stated hard coat films 1 to 52 and the liquid crystal displays 1 to 52 are shown in Tables 3 to 5.

TABLE 3

| Hard coat film No. | Cellulose ester film No. | Exposure dose (mJ/cm$^2$) | Durability against scratching (scratch qty) | Pencil hardness | Hardness unevenness | Flatness index | Visual flatness | Reflected color shading | Visibility | |
|---|---|---|---|---|---|---|---|---|---|---|
| 1 | 1 | 50 | 0 | 4H | A | A | A | A | A | Inv. |
| 2 | 2 | 50 | 0 | 4H | A | A | A | A | A | Inv. |
| 3 | 3 | 50 | 0 | 4H | A | A | A | A | A | Inv. |
| 4 | 4 | 50 | 0 | 4H | A | A | A | A | A | Inv. |
| 5 | 5 | 50 | 0 | 4H | A | A | A | A | A | Inv. |
| 6 | 6 | 50 | 0 | 4H | A | A | A | A | A | Inv. |
| 7 | 7 | 50 | 0 | 4H | A | A | A | A | A | Inv. |
| 8 | 8 | 50 | 0 | 4H | A | B | B | A | A | Inv. |
| 9 | 9 | 50 | 0 | 4H | A | B | B | A | A | Inv. |
| 10 | 10 | 50 | 0 | 4H | A | A | A | A | A | Inv. |
| 11 | 11 | 100 | 0 | 4H | A | A | A | A | A | Inv. |
| 12 | 12 | 50 | 0 | 4H | A | A | A | A | A | Inv. |
| 13 | 13 | 50 | 0 | 4H | A | A | A | A | A | Inv. |
| 14 | 14 | 50 | 0 | 4H | A | A | A | A | A | Inv. |
| 15 | 15 | 50 | 0 | 4H | A | A | A | A | A | Inv. |
| 16 | 16 | 50 | 0 | 4H | A | A | A | A | A | Inv. |
| 17 | 17 | 50 | 0 | 4H | A | A | A | A | A | Inv. |
| 18 | 18 | 50 | 0 | 4H | A | A | A | A | A | Inv. |
| 19 | 19 | 50 | 5 | 2H to 3H | B | C | D | D | D | Comp. |
| 20 | 20 | 50 | 5 | 2H to 3H | B | C | D | D | D | Comp. |
| 21 | 21 | 50 | 5 | 2H to 3H | B | C | D | D | D | Comp. |
| 22 | 22 | 120 | 20 | H to 2H | B | D | D | D | D | Comp. |
| 23 | 23 | 120 | 20 | H to 2H | B | D | D | D | D | Comp. |
| 24 | 24 | 120 | 20 | H to 2H | B | D | D | D | D | Comp. |
| 25 | 25 | 150 | 20 | H to 2H | B | D | D | D | D | Comp. |
| 26 | 26 | 100 | 30 or more | H | B | C | C | C | C | Comp. |
| 27 | 27 | 150 | 1 | 3H to 4H | B | D | D | D | D | Comp. |

A: No variation in lateral direction
B: Tendency of dropping at lateral ends
Inv.: Present invention
Comp.: Comparison

TABLE 4

| Hard coat film No. | Cellulose ester film No. | Hard coat layer thickness (H) μm | d/H | Exposure dose (mJ/cm$^2$) | Durability against scratching (scratch qty) | Pencil hardness | Hardness unevenness | Flatness index | Visual flatness | Reflected color shading | Visibility | |
|---|---|---|---|---|---|---|---|---|---|---|---|---|
| 28 | 1 | 2 | 25 | 50 | 2 | 4H | A | A | A | A | A | Inv. |
| 29 | 1 | 3 | 17 | 50 | 1 | 4H | A | A | A | A | A | Inv. |
| 30 | 1 | 5 | 10 | 50 | 0 | 4H | A | A | A | A | A | Inv. |
| 31 | 1 | 7 | 7 | 50 | 0 | 4H | A | A | A | A | A | Inv. |
| 32 | 1 | 10 | 5 | 50 | 0 | 4H | A | A | A | A | A | Inv. |
| 33 | 8 | 3 | 10 | 50 | 0 | 4H | A | A | A | A | A | Inv. |
| 34 | 8 | 5 | 6 | 50 | 0 | 4H | A | A | A | A | A | Inv. |

TABLE 4-continued

| Hard coat film No. | Cellulose ester film No. | Hard coat layer thickness (H) μm | d/H | Exposure dose (mJ/cm²) | Durability against scratching (scratch qty) | Pencil hardness | Hardness unevenness | Flatness index | Visual flatness | Reflected color shading | Visibility | |
|---|---|---|---|---|---|---|---|---|---|---|---|---|
| 35 | 8 | 10 | 3 | 50 | 0 | 4H | A | B | B | B | B | Inv. |
| 36 | 9 | 3 | 13 | 50 | 1 | 4H | A | A | A | A | A | Inv. |
| 37 | 9 | 5 | 8 | 50 | 0 | 4H | A | A | A | A | A | Inv. |
| 38 | 9 | 10 | 4 | 50 | 0 | 4H | A | A | A | A | A | Inv. |
| 39 | 10 | 3 | 20 | 50 | 2 | 4H | A | A | A | A | A | Inv. |
| 40 | 10 | 5 | 12 | 50 | 1 | 4H | A | A | A | A | A | Inv. |
| 41 | 10 | 10 | 6 | 50 | 0 | 4H | A | A | A | A | A | Inv. |
| 42 | 11 | 3 | 27 | 50 | 2 | 4H | A | A | A | A | A | Inv. |
| 43 | 11 | 5 | 16 | 50 | 1 | 4H | A | A | A | A | A | Inv. |
| 44 | 11 | 10 | 8 | 50 | 0 | 4H | A | A | A | A | A | Inv. |

Inv.; Present invention

TABLE 5

| Hard coat film | Cellulose ester film No. | Exposure intensity (mW/cm²) | Exposure dose (mJ/cm²) | Durability against scratching (scratch qty) | Pencil hardness | Hardness unevenness | Flatness index | Visual flatness | Reflected color shading | Visibility | |
|---|---|---|---|---|---|---|---|---|---|---|---|
| 45 | 1 | 20 | 50 | 2 | 4H | A | A | A | A | A | Inv. |
| 46 | 1 | 50 | 50 | 0 | 4H | A | A | A | A | A | Inv. |
| 47 | 1 | 100 | 50 | 0 | 4H | A | A | A | A | A | Inv. |
| 48 | 1 | 150 | 50 | 0 | 4H | A | A | A | A | A | Inv. |
| 49 | 1 | 200 | 50 | 0 | 4H | A | B | B | B | B | Inv. |
| 50 | 9 | 50 | 50 | 0 | 4H | A | A | A | A | A | Inv. |
| 51 | 9 | 150 | 50 | 0 | 4H | A | A | A | A | A | Inv. |
| 52 | 9 | 200 | 50 | 0 | 4H | A | B | B | B | B | Inv. |

Inv.; Present invention

In addition, the viewing angle of each liquid crystal display was measured with EZ-contrast manufactured by ELDIM Co., Ltd. Each viewing angle was represented by a range of an angle inclined to the direction normal to the plane of a liquid crystal panel showing a contrast ratio between white/black display of 10 or more. As a result, the liquid crystal displays 1 to 18, and 28 to 52 of the present invention, the displays employing polarizing plates of the present invention, proved to have a viewing angle equal to or greater than 160 degrees when measured from an oblique direction of 45 degrees. Even when there was undesired image capturing of fluorescent lamps in an oblique direction, black looked tight and reflected lights were free from color shading, without causing eyestrain. In contrast to this, with liquid crystal displays 19 to 27 for comparison, black from an oblique angle looked loose due to tiny wavy irregularities, visibility was low, and the effect on improvement in visibility by enlarging the viewing angle was reduced.

<Evaluation of Plasma Display>

The displays 1 to 27 were prepared by sticking the antireflective films No. 1 to 27 prepared above to the forefront of a panel (PDP-503HD manufactured by Pioneer Corporation) available on the market with adhesive. Each prepared display was mounted on a desk 75 cm high above a floor, and 8 sets of fluorescent lamps were arranged, at an interval of 1.5 m, on the ceiling part which was 3 m high above the floor, each one set being composed of 2 fluorescent lamps Palook (FL40SS ELW/type 37/37 watt, manufactured by Matsushita Electric Co., Ltd.). While an evaluator was facing the front face of the prepared display, the fluorescent lamps at the ceiling part were disposed behind and above the evaluator, and undesired image capturing of the fluorescent lamps was evaluated. As a result, it proved that, with antireflective films using a hard coat layer of the present invention, there was no distortion even in the undesired image capturing of near fluorescent lamps, and thus eyestrain was not caused even for a long time appreciation.

<Result>

Hard coat films of the present invention are excellent in terms of hardness and flatness, and can be cured in a low exposure dose. Accordingly, there were achieved hard coat films which excelled in productivity, and particularly even in the case where the hard coat films were produced employing cellulose ester films with a small thickness or a large width as a base material, the hard coat films had high hardness, evenness in hardness in the lateral direction, and high flatness. Further, there were obtained liquid crystal displays which were allowed to be free from irregularities in reflected light by providing an antireflective layer on these hard coat films, and had high visibility from an oblique direction, making use of the effect of enlarging viewing angles achieved by such hard coat films to be used for a polarizing plate. Further, even if these hard coat films were applied to display devices such as plasma displays greater than a 30-inch type, reflected images were not distorted in a wavy shape, which proved that eyestrain is thus prevented.

The present invention makes it possible to provide hard coat films excellent in hardness and having uniform durability against scratches and high flatness even with a small thickness and a large width, and to provide a method for producing the same with high productivity. Using these hard coat films, it is possible to provide antireflective films for which color shading is greatly reduced, polarizing plates, and display devices, the polarizing plates and the display devices using the antireflective films and thereby excelling in flatness.

What is claimed is:

1. A hard coat film comprising a cellulose ester film containing a UV absorbing agent and two or more plasticizers, the cellulose ester film having thereon a layer of an actinic ray-cured resin,
   wherein:
   (i) one of the plasticizers is a polyalcohol ester and the other is a non-phosphate ester;
   (ii) the cellulose ester has a total acyl substitution degree from 2.6 to 2.9;
   (iii) the cellulose ester has a number average molecular weight (Mn) from 80,000 to 200,000;
   (iv) the cellulose ester has a Mw/Mn ratio from 1.4 to 3.0, Mw representing a weight average molecular weight;
   (v) the cellulose ester film is a biaxially stretched cellulose ester film; and
   (vi) the actinic ray-cured resin layer is prepared by coating an actinic ray-curable resin on the cellulose ester film followed by hardening the actinic ray-curable resin via irradiation;
   (vii) the cellulose ester film has a thickness of from 10 to 70 microns, and a d/H value from 4 to 10, d representing a thickness of the cellulose ester film and H representing a thickness of the layer of the actinic ray-cured resin.

2. The hard coat film of claim 1 wherein an amount of the actinic ray for irradiation is from 5 to 100 mJ/cm$^2$.

3. The hard coat film of claim 1 wherein an intensity of the actinic ray for irradiation is from 50 to 150 mW/cm$^2$.

4. The hard coat film of claim 1 wherein the non-phosphate ester plasticizer is selected from the group consisting of: a citrate ester, a glycolate ester, a phthalate ester and a fatty acid ester.

5. The hard coat film of claim 1 wherein the cellulose ester film has a width from 1.4 to 4 m.

6. A polarizing plate comprising the hard coat film of claim 1,
   wherein:
   (i) an antireflective film is provided on one surface of the hard coat film, said one surface having the actinic ray-cured resin layer; and
   (ii) a polarizing film and a cellulose ester retardation film are provided in that order on the other surface of the hard coat film.

7. A liquid crystal display having the polarizing plate of claim 6 on a surface of the liquid crystal display.

8. A liquid crystal display provided with the hard coat film of claim 1 on a surface of the liquid crystal display.

9. A method of producing a hard coat film comprising the steps of:
   (i) flow-casting a solution containing a cellulose ester, a UV absorbing agent, two or more plasticizers and a solvent on a support so as to form a cellulose ester film, wherein:
      (a) one of the plasticizers is a polyalcohol ester and the other is a non-phosphate ester;
      (b) the cellulose ester has a total acyl substitution degree from 2.6 to 2.9;
      (c) the cellulose ester has a number average molecular weight (Mn) from 80,000 to 200,000; and
      (d) the cellulose ester has a Mw/Mn ratio from 1.4 to 3.0, Mw representing a weight average molecular weight;
   (ii) drying the cellulose ester film to a state in which the cellulose ester film is capable of being peeled from the support;
   (iii) peeling the cellulose ester film from the support;
   (iv) biaxially stretching the cellulose ester film while the cellulose ester film still contains the solvent;
   (v) drying the cellulose ester film;
   (vii) coating an actinic ray-curable resin on the cellulose ester film; and
   (vii) hardening the actinic ray-curable resin by irradiating with an actinic ray wherein the cellulose ester film has a thickness of from 10 to 70 microns, and a d/H value from 4 to 10, d representing a thickness of the cellulose ester film and H representing a thickness of the layer of the actinic ray-cured resin.

10. The method of claim 9 wherein the cellulose ester film is stretched in a longitudinal direction, and then is stretched in a lateral direction using a tenter, while the film still contains the solvent.

11. The method of claim 10 wherein the actinic ray-curable resin is hardened while the film is stretched.

12. The method of claim 9 wherein the actinic ray-curable resin is hardened while the film is stretched.

13. The method of claim 9, wherein a quantity of the actinic ray for irradiation is from 5 to 100 mJ/cm$^2$.

* * * * *